US012643994B2

(12) United States Patent
Stipe et al.

(10) Patent No.: US 12,643,994 B2
(45) Date of Patent: Jun. 2, 2026

(54) HEAT DISSIPATIVE AND LIGHTWEIGHT OPTICAL ELEMENTS HAVING INCREASED STRENGTH AND STIFFNESS

(71) Applicant: META PLATFORMS TECHNOLOGIES, LLC, Menlo Park, CA (US)

(72) Inventors: Christopher Stipe, Woodinville, WA (US); Andrew John Ouderkirk, Kirkland, WA (US); Eugene Cho, Seattle, WA (US); Sheng Ye, Redmond, WA (US); Arman Boromand, Issaquah, WA (US); Alex Ockfen, Bothell, WA (US); Nagi Hosni Elabbasi, Southborough, MA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 1150 days.

(21) Appl. No.: 17/669,157

(22) Filed: Feb. 10, 2022

(65) Prior Publication Data

US 2022/0348748 A1 Nov. 3, 2022

Related U.S. Application Data

(60) Provisional application No. 63/182,615, filed on Apr. 30, 2021.

(51) Int. Cl.
| | |
|---|---|
| *C08L 23/06* | (2006.01) |
| *C08J 5/18* | (2006.01) |

(Continued)

(52) U.S. Cl.
CPC ................. *C08L 23/06* (2013.01); *C08J 5/18* (2013.01); *G02B 1/041* (2013.01); *G02B 5/208* (2013.01);

(Continued)

(58) Field of Classification Search
CPC .. G02B 5/3083; G02B 5/3041; G02B 5/3033; G02B 5/30; G02B 5/305; G02B 5/3016;

(Continued)

(56) References Cited

U.S. PATENT DOCUMENTS 6,441,956 B1 * 8/2002 Perlo ...................... G02B 13/14
359/356

FOREIGN PATENT DOCUMENTS

| | | |
|---|---|---|
| EP | 0163424 A2 | 12/1985 |
| WO | 2020201502 A1 | 10/2020 |

OTHER PUBLICATIONS

Lin et al., Glass-like transparent high strength polyethylene films by tuning drawing temperature, 2019 (Year: 2019).*

(Continued)

*Primary Examiner* — Ephrem Z Mebrahtu
(74) *Attorney, Agent, or Firm* — Greenberg Traurig, LLP

(57) ABSTRACT

A polymer thin film includes polyethylene having a weight average molecular weight of at least approximately 500,000 g/mol, where the thin film is characterized by transparency within the visible spectrum of at least approximately 80%, bulk haze of less than approximately 5%, and an in-plane elastic modulus of at least approximately 10 GPa. The polymer thin film may be thermally conductive and may be incorporated into an optical element and configured to dissipate heat, such as from a light-emitting device.

15 Claims, 22 Drawing Sheets

100

(51) Int. Cl.
  G02B 1/04          (2006.01)
  G02B 5/20          (2006.01)
  G02B 27/01         (2006.01)

(52) U.S. Cl.
  CPC ....... *C08J 2323/06* (2013.01); *C08L 2201/10* (2013.01); *C08L 2203/16* (2013.01); *C08L 2207/068* (2013.01); *G02B 27/0172* (2013.01)

(58) Field of Classification Search
  CPC ..... G02B 1/04; G02B 1/041; C08L 2207/068; C08L 23/06; C08J 5/18
  See application file for complete search history.

(56)                    References Cited

OTHER PUBLICATIONS

Bastiaansen et al., Transparency and dichroism of ultra-drawn UHMW-PE films in the visible wavelength range, 1993 (Year: 1993).*

Standard Test Method for Haze and Luminous Transmittance of Transparent Plastics (Year: 2021).*

Choy et al., Thermal conductivity of highly oriented polyethylene (Year: 1977).*

Dayyaub et al., The Structure and Mechanical Properties of the UHMWPE Films Modified by the Mixture of Graphene Nanoplates with Polyaniline, 2018 (Year: 2018).*

International Search Report and Written Opinion for International Application No. PCT/US2022/027182, mailed Aug. 5, 2022, 12 pages.

Pan X., et al., "The Role of Polyethylene Wax on the Thermal Conductivity of Transparent Ultradrawn Polyethylene Films," Macromolecules, Jun. 15, 2020, vol. 53, pp. 5599-5603.

Ronca S., et al., "Metallic-like Thermal Conductivity in a Light-weight Insulator: Solid-state Processed Ultra High Molecular Weight Polyethylene Tapes and Films," Polymers, Jul. 10, 2017, vol. 123, pp. 203-210.

International Preliminary Report on Patentability for International Application No. PCT/US2022/027182, mailed Nov. 9, 2023, 10 pages.

Office Action mailed Jul. 25, 2025 for Taiwan Application No. 111116477, filed Apr. 29, 2022, 7 pages.

* cited by examiner

*A*              *B*

| Case | Max. Temperature (World Side (°C)) | Std. Dev. Temperature (World Side (°C)) |
|---|---|---|
| PC Only | 51.7 | 5.3 |
| 50 µm PE (Horizontal Stretch) | 44.5 | 3.3 |
| 50 µm PE (Vertical Stretch) | 44.2 | 3.5 |
| 2x25 µm PE (Alternating Directions) | 39.1 | 2.4 |

*FIG. 12*

Temperature (°C) for 50 um PE Layer (Horizontal Alignment)

Temperature (°C) for 50 um PE Layer (Horizontal Alignment)

Temperature (°C) for 2x25 um PE Layers (Alternating Directions)

Temperature (°C) for 2x25 um PE Layers (Alternating Directions)

System
2600

2602

2604

2606(B)

2606(A)

HEAT DISSIPATIVE AND LIGHTWEIGHT OPTICAL ELEMENTS HAVING INCREASED STRENGTH AND STIFFNESS

CROSS-REFERENCE TO RELATED APPLICATION

This application claims the benefit of priority under 35 U.S.C. § 119(e) of U.S. Provisional Application No. 63/182, 615, filed Apr. 30, 2021, the contents of which are incorporated herein by reference in their entirety.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

FIG. 12 shows the temperature profile for an optical element having a vertically-oriented high thermal conductivity ultra-high molecular weight polymer thin film laminated to each major surface of the polycarbonate lens of FIG. 11 according to some embodiments.

Figure 1:
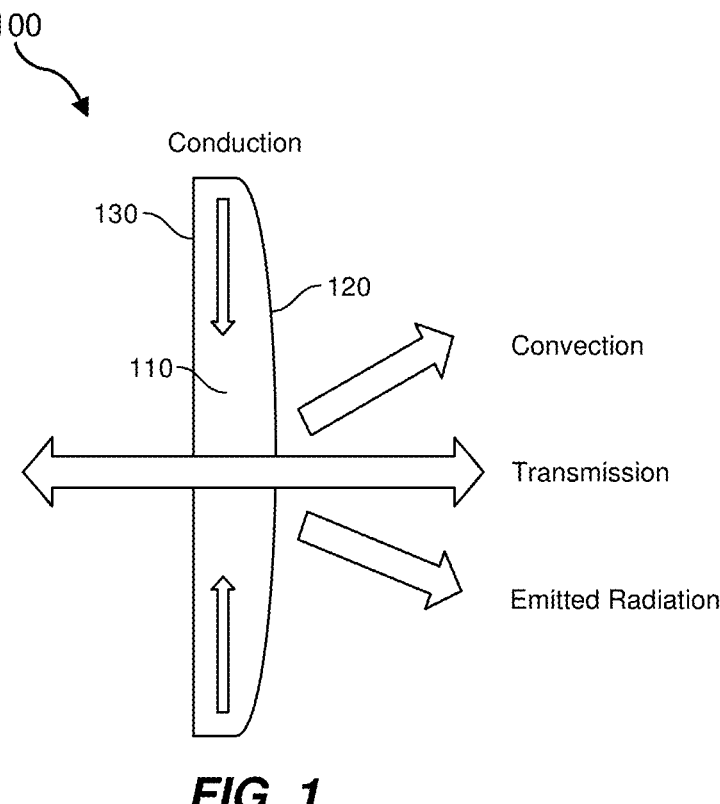
FIG. 1 is a schematic illustration showing thermal energy pathways through and from an example optical element according to some embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Polymer materials may be used in a variety of different optic and electro-optic device architectures, including active and passive optics and electroactive devices. Lightweight and conformable, one or more polymer layers may be incorporated into wearable devices such as smart glasses and are attractive candidates for emerging technologies including virtual reality/augmented reality devices where a comfortable, adjustable form factor is desired.

Virtual reality (VR) and augmented reality (AR) eyewear devices or headsets, for instance, may enable users to experience events, such as interactions with people in a computer-generated simulation of a three-dimensional world or viewing data superimposed on a real-world view. By way of example, superimposing information onto a field of view may be achieved through an optical head-mounted display (OHMD) or by using embedded wireless glasses with a transparent heads-up display (HUD) or augmented reality (AR) overlay. VR/AR eyewear devices and headsets may be used for a variety of purposes. For example, governments may use such devices for military training, medical professionals may use such devices to simulate surgery, and engineers may use such devices as design visualization aids.

These and other applications may leverage one or more characteristics of thin film polymer materials, including the refractive index to manipulate light, mechanical strength to provide structural support and/or in the example of powered optical systems, thermal conductivity to provide heat dissipation and decrease temperature non-uniformity during operation.

As will be appreciated, and by way of example, lenses often add a considerable amount of bulk to AR glasses. Accordingly, it may be desirable to reduce the size and mass of AR lenses so as to decrease the profile and weight of head-mounted displays (HMDs). However, decreasing the lens thickness typically compromises stiffness and strength, potentially exposing the lens and adjacent components to damage during use.

In addition to the foregoing, electronic devices and systems may generate excessive heat that may lead to user discomfort, overheating, and potential device or system failure in the field. In this regard, lenses typically represent a large fraction of the overall surface area of many optical devices and are often made of relatively low thermal conductivity materials such as plastic or glass. Such materials limit heat dissipation, however, and may disadvantageously increase the temperature non-uniformity across the lens surface. In this vein, the prevailing solution, which involves thermal throttling, may impose operational constraints and undesirably limit functionality.

Notwithstanding recent developments, it would be advantageous to provide polymer or other dielectric materials having improved optical, mechanical, and thermal properties, including optical transparency, mechanical stability, and a controllable thermal conductivity. Additionally, it would be desirable to reduce the thickness and weight of lenses without sacrificing strength, stiffness, or visual clarity.

In accordance with various embodiments, a polymer thin film adapted for use in lens systems and other optical elements may include ultra-high molecular weight polyethylene (PE). As used herein, "ultra-high molecular weight polyethylene" or an "ultra-high molecular weight polymer" may include extremely long polymer chains and have a molecular weight of at least approximately 500,000 g/mol, e.g., approximately 500,000, approximately 1,000,000, approximately 2,000,000, approximately 4,000,000, or approximately 6,000,000 g/mol, including ranges between any of the foregoing values. Use herein of the term "molecular weight" may, in some examples, refer to a weight average molecular weight.

Characteristic properties of a polymer thin film, including its refractive index, elastic modulus, thermal conductivity, etc. may be determined by its chemical composition, the chemical structure of the polymer repeat unit, its density and extent of crystallinity, as well as the alignment of the crystals and/or polymer chains. Among these factors, the crystal or polymer chain alignment may dominate. In crystalline or semi-crystalline polymer thin films, opto-mechanical and thermal properties may be correlated to the degree or extent of crystal orientation, whereas the degree or extent of chain entanglement may create comparable properties in amorphous polymer thin films.

An applied stress may be used to create a preferred alignment of crystals or polymer chains within a polymer thin film and induce a corresponding modification of optical, mechanical, and thermal properties along different directions of the film. As disclosed further herein, a polymer thin film may be stretched to induce a preferred alignment of crystals/polymer chains and an attendant modification of one or more properties. Stretching may include the application of a uniaxial or biaxial stress.

The presently disclosed anisotropic polyethylene-based polymer thin films may be characterized as optical quality polymer thin films and may form, or be incorporated into, an optical element such as a lens. Such optical elements may be used in various display devices, such as virtual reality (VR) and augmented reality (AR) glasses and headsets. The value of these and other optical elements may depend on their degree of optical clarity, mechanical strength and/or thermal conductivity.

According to various embodiments, an "optical quality polymer thin film" or an "optical thin film" may, in some examples, be characterized by a transmissivity within the visible light spectrum (400-700 nm) of at least approximately 80%, e.g., approximately 80, approximately 90, approximately 95, approximately 97, approximately 98, approximately 99, or approximately 99.5%, including ranges between any of the foregoing values, and less than approximately 5% bulk haze, e.g., approximately 0.1, 0.2, 0.4, 1, 2, or 4% bulk haze, including ranges between any of the foregoing values.

In some embodiments, a polymer thin film may be characterized by a transmissivity within the infrared spectrum (700 nm-1 mm) of at least approximately 80%, e.g., approximately 80, approximately 90, approximately 95, approximately 97, approximately 98, approximately 99, or approximately 99.5%, including ranges between any of the foregoing values. In some embodiments, a polymer thin film may be characterized by a transmissivity within the radio frequency spectrum (greater than 1 mm) of at least approximately 80%, e.g., approximately 80, approximately 90, approximately 95, approximately 97, approximately 98, approximately 99, or approximately 99.5%, including ranges between any of the foregoing values.

As used herein, a transmissivity "within" a recited spectral range may refer to a transmissivity at a particular wavelength or over a range of wavelengths within the spectral range. A transmissivity "across" a recited spectral range may refer to a transmissivity over the entire recited spectral range.

In further embodiments, an optical quality (e.g., polyethylene) polymer thin film may be incorporated into a multilayer structure, such as the "A" layer in an ABAB multilayer. Further multilayer architectures may include AB, ABA, ABAB, or ABC configurations. Each B layer (and each C layer, if provided) may include a further polymer composition, such as polycarbonate or polyvinylidene fluoride. According to some embodiments, the B (and C) layer(s) may be electrically conductive and may include, for example, indium tin oxide (ITO) or poly(3,4-ethylenedioxythiophene).

In a multilayer architecture, each PE layer may have a thickness ranging from approximately 2 micrometers to approximately 100 micrometers, e.g., 2, 5, 10, 20, 50, or 100 micrometers, including ranges between any of the foregoing values. A multilayer stack may include two or more such layers. In some embodiments, a density of a PE layer or thin film may be less than approximately 1.5 $g/cm^3$, e.g., less than approximately 1.5, less than approximately 1.25, or less than approximately 1.0 $g/cm^3$, including ranges between any of the foregoing values.

According to some embodiments, the areal dimensions (i.e., length and width) of an anisotropic polymer thin film may independently range from approximately 5 cm to approximately 50 cm or more, e.g., 5, 10, 20, 30, 40, or 50 cm, including ranges between any of the foregoing values. Example anisotropic polymer thin films may have areal dimensions of approximately 5 cm×5 cm, 10 cm×10 cm, 20 cm×20 cm, 50 cm×50 cm, 5 cm×10 cm, 10 cm×20 cm, 10 cm×50 cm, etc.

According to some embodiments, a polyethylene composition (i.e., melt or solution) may be extruded or cast to form a polymer thin film. A polymer composition capable of crystallizing, for example, may be formed into a single layer using appropriate extrusion and casting operations. For example, a polyethylene (PE) composition may be extruded and oriented as a single layer to form an optically, mechanically and/or thermally anisotropic thin film. According to further embodiments, a crystallizable polymer may be co-extruded with other polymer materials that are either crystallizable, or those that remain amorphous after orientation, to form a multilayer structure.

As used herein, the terms "polymer thin film" and "polymer layer" may be used interchangeably. Furthermore, reference to a "polymer thin film" or a "polymer layer" may include reference to a "multilayer polymer thin film" and the like, unless the context clearly indicates otherwise.

An anisotropic polymer thin film may be formed by applying a desired stress state to a crystallizable polymer thin film. For instance, a polyethylene (PE) thin film may be stretched to induce opto-mechanical anisotropy through crystal and/or chain realignment. By way of example, an ultra-high molecular weight PE film may be oriented either uniaxially or biaxially as a single layer or multilayer to form an optically or mechanically anisotropic polymer thin film.

In some embodiments, the application of an in-plane biaxial stress may be performed simultaneously or sequentially.

An anisotropic polymer thin film may be formed using a thin film orientation system configured to heat and stretch a polymer thin film in at least one in-plane direction in one or more distinct regions thereof. In some embodiments, a thin film orientation system may be configured to stretch a polymer thin film, i.e., a crystallizable polymer thin film, along only one in-plane direction. For instance, a thin film orientation system may be configured to apply an in-plane stress to a polymer thin film along the x-direction while allowing the thin film to relax along an orthogonal in-plane direction (i.e., along the y-direction). As used herein, the relaxation of a polymer thin film may, in certain examples, accompany the absence of an applied stress along a relaxation direction.

According to some embodiments, within an example system, a polymer thin film may be heated and stretched transversely to a direction of film travel through the system. In such embodiments, a polymer thin film may be held along opposing edges by plural movable clips slidably disposed along a diverging track system such that the polymer thin film is stretched in a transverse direction (TD) as it moves along a machine direction (MD) through heating and deformation zones of the thin film orientation system. In some embodiments, the stretching rate in the transverse direction and the relaxation rate in the machine direction may be independently and locally controlled.

According to some embodiments, within a further example system, a polymer thin film may be heated and stretched parallel to a direction of film travel through the system. In such embodiments, a polymer thin film may be held along opposing edges by plural movable clips slidably disposed along a converging track system such that the polymer thin film is stretched in the machine direction (MD) as it moves along the machine direction (MD) through heating and deformation zones of the thin film orientation system. In certain embodiments, large scale production may be enabled using a roll-to-roll manufacturing platform.

A polyethylene polymer thin film may be formed by applying a stress to a cast polymer thin film. In some examples, a stretch ratio may be greater than 4, e.g., 5, 10, 20, 30, 40, or more. The act of stretching may include a single stretching step or plural (i.e., successive) stretching steps where one or more of a stretching temperature and a strain rate may be independently controlled.

In certain aspects, the tensile stress may be applied uniformly or non-uniformly along a lengthwise or widthwise dimension of the polymer thin film. In certain embodiments, the strain realized in response to the applied tensile stress may be at least approximately 20%, e.g., approximately 20%, approximately 50%, approximately 100%, approximately 200%, approximately 400%, approximately 500%, approximately 1000%, approximately 2000%, approximately 3000%, or approximately 4000% or more, including ranges between any of the foregoing values. The stretching rate in the transverse direction and the relaxation rate in the machine direction (or vice versa) may be independently and locally controlled.

An example method of forming a polyethylene polymer thin film may include uniaxially orienting a cast polymer thin film with a stretch ratio of at least approximately 400% (e.g., 400%, 500%, 600%, 700%, 800%, 900%, 1000%, or 2000% or more, including ranges between any of the foregoing values). A further example method may include biaxially orienting a cast polymer thin film with independent stretch ratios along each in-plane direction of at least approximately 400% (e.g., 400%, 500%, 600%, 700%, 800%, 900%, 1000%, or 2000% or more, including ranges between any of the foregoing values). Biaxial stretching may be performed simultaneously or in successive stretching steps.

Higher stretch ratios may effectively unfold relatively elastic lamellar polymer crystals and increase the extent of crystal alignment within the resulting anisotropic polymer thin film. In various examples, a modulus of elasticity of the stretched polymer thin film along a stretch direction thereof may be proportional to the stretch ratio.

Heating of the polymer thin film may accompany the application of the tensile stress. For instance, a semi-crystalline polymer thin film may be heated to a temperature greater than room temperature ($\sim$23° C.) to facilitate deformation of the thin film and the formation and realignment of crystals and/or polymer chains therein.

The temperature of the polymer thin film may be maintained at a desired value or within a desired range before, during and/or after the act of stretching, i.e., within a pre-heating zone or a deformation zone downstream of the pre-heating zone, in order to improve the deformability of the polymer thin film relative to an un-heated polymer thin film. The temperature of the polymer thin film within a deformation zone may be less than, equal to, or greater than the temperature of the polymer thin film within a pre-heating zone.

In some embodiments, the polymer thin film may be heated to a constant temperature throughout the act of stretching. In some embodiments, a region of the polymer thin film may be heated to different temperatures, i.e., during and/or subsequent to the application of the tensile stress. In some embodiments, different regions of the polymer thin film may be heated to different temperatures. In some embodiments, the act of stretching may include a constant or changing thin film temperature and/or a constant or changing strain rate.

The crystalline content within the polymer thin film may increase during the act of stretching. Alternatively, stretching may alter the orientation of crystals and/or an average crystallite size within a polymer thin film without substantially changing the crystalline content.

According to various embodiments, a crystalline phase in a "crystalline" or "semi-crystalline" polymer thin film may, in some examples, constitute at least approximately 30% of the polymer thin film. For instance, the crystalline content of a polyethylene thin film may be at least approximately 30%, e.g., 30, 40, 50, 60, 70, or 80%, including ranges between any of the foregoing values.

Following deformation of the polymer thin film, the heating may be maintained for a predetermined amount of time, followed by cooling of the polymer thin film. The act of cooling may include allowing the polymer thin film to cool naturally, at a set cooling rate, or by quenching, such as by purging with a low temperature gas, which may thermally stabilize the polymer thin film.

In some embodiments, following stretching, the polymer thin film may be annealed. Annealing may be performed at a fixed or variable stretch ratio and/or a fixed or variable applied stress. An example annealing temperature may be greater than approximately 60° C., e.g., 80° C., 100° C., 120° C., 130° C., 140° C., 150° C., 160° C., 170° C., 180° C., or 190° C., including ranges between any of the foregoing values. The annealing process may include a single annealing step (e.g., at a single temperature) or multiple steps (e.g., at multiple temperatures). Annealing may stabilize the orientation of polymer chains and decrease the propensity for shrinkage of the polymer thin film.

The application of a uniaxial or biaxial stress to a single or multilayer thin film may be used to align polymer chains and/or orient crystals to induce optical and mechanical anisotropy. Thus, following deformation, the crystals or chains may be at least partially aligned with the direction of the applied tensile stress. Example anisotropic polymer thin films may exhibit a high degree of birefringence, a high degree of optical clarity, low bulk haze, a high mechanical strength and toughness, and a high thermal conductivity.

In accordance with various embodiments, anisotropic polymer thin films may include fibrous, amorphous, partially crystalline, or wholly crystalline materials. Such materials may also be mechanically anisotropic, where one or more characteristics selected from compressive strength, tensile strength, shear strength, yield strength, stiffness, hardness, ductility, machinability, thermal expansion, piezoelectric response, and creep behavior may be directionally dependent.

In some embodiments, one or more organic solid thin film layers may be diced and stacked to form a multilayer. A multilayer thin film may be formed by clocking and stacking individual layers. That is, in an example "clocked" multilayer stack, an angle ($\Theta$) of misorientation, i.e., with respect to crystalline axes of neighboring layers, may range from approximately 1° to approximately 90°, e.g., 1, 2, 5, 10, 20, 30, 40, 45, 50, 60, 70, 80, or 90°, including ranges between any of the foregoing values.

Anisotropic polymer thin films may be used to fabricate anisotropic substrates, birefringent substrates, high Poisson's ratio thin films, reflective polarizers, birefringent mirrors, and the like, and may be incorporated into unimorph and bimorph actuators, haptic articles (e.g., gloves), AR/VR headsets, AR/VR combiners, or used to provide display brightness enhancement.

Aspects of the present disclosure thus relate to the formation of a single layer of an anisotropic polymer thin film as well as a multilayer polymer thin film having improved optical, mechanical, and thermal conduction properties. The improved mechanical properties may include improved dimensional stability and improved compliance in conforming to a surface having compound curvature, such as a lens. The improved thermal conductivity may promote heat dissipation from an optical element during use.

As will be appreciated, ultra-high molecular weight polyethylene thin films may be characterized by optical transparency, modulus of elasticity and mechanical strength, and thermal conductivity values that are significantly higher, and density values that are significantly lower, than comparative bulk polymer materials. In some embodiments, ultra-high molecular weight polyethylene thin films may be optically transparent, optically birefringent, and may be characterized by a directionally dependent modulus of elasticity and/or a directionally dependent thermal conductivity.

As used herein, a material or element that is "transparent" or "optically transparent" may, for a given thickness, have a transmissivity within the visible light spectrum of at least approximately 80%, e.g., approximately 80, 90, 95, 97, 98, 99, or 99.5%, including ranges between any of the foregoing values, and less than approximately 5% bulk haze, e.g., approximately 0.1, 0.2, 0.4, 1, 2, or 4% bulk haze, including ranges between any of the foregoing values. Transparent materials will typically exhibit very low optical absorption and minimal optical scattering.

As used herein, the terms "haze" and "clarity" may refer to an optical phenomenon associated with the transmission of light through a material, and may be attributed, for example, to the refraction of light within the material, e.g., due to secondary phases or porosity and/or the reflection of light from one or more surfaces of the material. As will be appreciated by those skilled in the art, haze may be associated with an amount of light that is subject to wide angle scattering (i.e., at an angle greater than 2.5° from normal) and a corresponding loss of transmissive contrast, whereas clarity may relate to an amount of light that is subject to narrow angle scattering (i.e., at an angle less than 2.5° from normal) and an attendant loss of optical sharpness or "see through quality."

According to some embodiments, an ultra-high molecular weight polymer thin film or multilayer may have an in-plane modulus of elasticity of at least approximately 10 GPa, e.g., at least approximately 10 GPa, at least approximately 25 GPa, at least approximately 50 GPa, at least approximately 75 GPa, or at least approximately 100 GPa, including ranges between any of the foregoing values. In particular embodiments, an ultra-high molecular weight polymer thin film may be anisotropic where at least two of three mutually orthogonal moduli differ. The anisotropic axis may be aligned vertically, horizontally, or at any angle in between.

According to some embodiments, an ultra-high molecular weight polymer thin film or multilayer may have a tensile strength of at least approximately 0.5 GPa, e.g., 0.6, 0.8, 1.0, 1.2, 1.4, 1.6, 1.8, or 2 GPa, including ranges between any of the foregoing values.

A thickness of an ultra-high molecular weight polymer thin film or multilayer may range from approximately 2 micrometers to approximately 100 micrometers or more, e.g., 2, 5, 10, 25, 50, or 100 micrometers, including ranges between any of the foregoing values. A density of an ultra-high molecular weight polymer thin film may be less than approximately 1.5 g/cm$^3$. By way of example, an ultra-high molecular weight polymer thin film may have a density of approximately 0.9 g/cm$^3$, approximately 1 g/cm$^3$, approximately 1.2 g/cm$^3$, approximately 1.3 g/cm$^3$, approximately 1.4 g/cm$^3$, or approximately 1.5 g/cm$^3$, including ranges between any of the foregoing values.

Example ultra-high molecular weight polymer thin films and multilayers may have a thermal conductivity along at least one dimension of at least approximately 5 W/mK (e.g., 5 W/mK, 10 W/mK, 25 W/mK, 50 W/mK, or 100 W/mK, including ranges between any of the foregoing values). For example, the thermal conductivity may be anisotropic along the crystalline direction of the polymer molecules within a given layer or arrangement of plural layers. Example polymer thin films may exhibit an anisotropy in thermal conductivity (e.g., an in-plane anisotropy) of at least 2:1, e.g., 2:1, 5:1, 10:1, 20:1, 50:1, 100:1, 150:1, etc., including ranges between any of the foregoing ratios. Such anisotropy in the thermal conductivity may be oriented along any desired direction with respect to an adjacent substrate, and in some embodiments, an optical element may include two or more independently-oriented ultra-high molecular weight polymer thin films.

In accordance with some embodiments, an optical assembly such as a lens system may include an ultra-high molecular weight polyethylene thin film. An optical element may include a free-standing ultra-high molecular weight polymer thin film or multilayer, or in further examples, an optical element may include a composite architecture having an ultra-high molecular weight polymer thin film or multilayer disposed over one or both major surfaces of a substrate. An ultra-high molecular weight polymer thin film may be laminated to one or both sides of a suitable substrate, such as a lens, for example. A substrate, if provided, may include glass, ceramic, polymer, or other optically transparent material. An example polymer substrate may include polycarbonate. In some examples, the ultra-high molecular weight polyethylene thin film may be doped with other materials (e.g., graphene, metals, etc.) to adjust its thermal properties.

The ultra-high molecular weight polymer thin films disclosed herein may be transparent, low haze, light-weight, and have a high thermal conductivity along at least one dimension, and may be integrated into composite lenses and with other optical substrates to increase heat dissipation and provide temperature uniformity. Accordingly, the ultra-high molecular weight polymer thin films may be configured to attenuate CTE-related deformations in various devices and systems, thus improving performance and extending lifetime. In some embodiments, the ultra-high molecular weight polymer thin films may increase the strength of such lenses, enabling the formation of thinner lenses having sufficient rigidity and clarity.

Without wishing to be bound by theory, drawn ultra-high molecular weight polymer thin films may include a network of highly ordered chains along the draw direction that may support phonon energy transport and manifest as high thermal anisotropy. In some examples, the ultra-high molecular weight polymer thin films may be ultra-drawn to further enhance characteristics of the films, such as transparency, clarity, rigidity, strength, and/or thermal conductivity. Thin films may achieve these properties using high draw ratio stretching in a controlled thermal environment leading to highly aligned molecular chains.

In accordance with various embodiments, a polymer thin film may include ultra-high molecular weight polyethylene and may be characterized by two or more (e.g., 2, 3, 4, 5, 6, 7, 8, 9, or 10) attributes selected from (a) transparency within the visible spectrum of at least approximately 80%, (b) transparency within the infrared spectrum of at least approximately 80%, (c) transparency within the radio frequency spectrum of at least approximately 80%, (d) bulk haze of less than approximately 5%, (e) elastic modulus of at least approximately 10 GPa, (f) tensile strength of at least approximately 0.5 GPa, (g) crystalline content of at least approximately 30%, (h) thermal conductivity of at least approximately 5 W/mK, (i) density of less than approximately 1.5 g/cm$^3$, and (j) thickness of greater than approximately 5 micrometers.

Example optical elements may form a lens or a window in an artificial reality or virtual reality device. Further example optical elements may define a surface, e.g., of a watch, phone, tablet, TV, monitor, and the like, or form an interlayer, e.g., between a light source and a light receiver. As an interlayer, an ultra-high molecular weight polymer thin film may provide a heat conduit without affecting the transfer of photons between the source and the receiver. According to various embodiments, the optical elements disclosed herein may be configured to dissipate heat from a light emitting device (e.g., VCSEL or LED) and provide temperature uniformity in related devices and systems while maintaining desired optical performance.

In certain embodiments, an optical element may be located within the transparent aperture of an optical device such as a lens, although the present disclosure is not particularly limited and may be applied in a broader context. By way of example, an optical element may be incorporated into a tunable lens, accommodative optical element, adaptive optics, etc.

An optical element may include a transparent substrate and an ultra-high molecular weight polymer thin film laminated to the substrate. In some embodiments, the laminated ultra-high molecular weight polymer thin film may increase heat dissipation while maintaining the reflected color of the substrate. An optical element may additionally include an infrared reflecting layer that is configured to reflect infrared light emitted from the optical element or transmitted into the optical element. An optical element may be optically transparent.

The ultra-high molecular weight polymer thin films may be laminated to one side or both sides of an optical base material or substrate. Alternatively, the ultra-high molecular weight polymer thin film may constitute the entire optical element structure itself. In various embodiments, the ultra-high molecular weight polymer thin films may not be electrically conductive and, therefore, the films may be essentially transparent to radio frequencies suitable for WiFi and BLUETOOTH applications.

In some embodiments, one side of the optical element may include an additional thin film or layer of deposited material that is adapted to reflect infrared light emitted from within the optical element or transmitted into the optical element. In certain examples, the surface of the optical element facing the user may have a low emissivity, reducing thermal emission to the user's face.

Ultra-high molecular weight polymer thin films may be bonded to the base optical materials in any suitable manner. For example, the films may be bonded to a substrate using an optical adhesive (OCA), liquid optical adhesive (LOCA), or others. Suitable adhesives include silicone, acrylic, epoxy, etc. The adhesives may be thermally or optically cured or pressure sensitive.

Features from any of the embodiments described herein may be used in combination with one another in accordance with the general principles described herein. These and other embodiments, features, and advantages will be more fully understood upon reading the following detailed description in conjunction with the accompanying drawings and claims.

The following will provide, with reference to FIGS. 1-26, detailed descriptions of optical elements that include an ultra-high molecular weight polymer thin film having high optical quality, high mechanical strength, and high thermal conductivity, as well as applications thereof. The discussion associated with FIG. 1 includes a description of heat loss mechanisms for an example optical element. The discussion associated with FIGS. 2 and 3 relates to example manufacturing paradigms for producing optical quality, high strength, high modulus, and thermally conductive polymer thin films suitable for a variety of optical, mechanical, and optomechanical applications. The discussion associated with FIG. 4 includes a summary of the modeled heat dissipation from various optical elements. The discussion associated with FIGS. 5 and 6 includes a description of example optical element architectures that include one or more oriented ultra-high molecular weight polymer thin films. The discussion associated with FIGS. 7 and 8 includes a description of the heat loss characteristics for an ultra-high molecular weight polyethylene thin film. The discussion associated with FIG. 9 includes a description of the maximum world side temperature associated with example optical element architectures. The discussion associated with FIG. 10 includes a description of segmented heat flux boundary conditions for an optical element. The discussion associated with FIGS. 11-14 includes a description of the temperature profile for example optical element architectures. Additionally, the discussion associated with FIG. 15 includes a description of an example optical element architecture that includes multiple oriented ultra-high molecular weight polymer thin films having anisotropic axes that are aligned in different directions. The discussion associated with FIGS. 16-24 includes a description demonstrating improvements in strength and rigidity of optical elements that include oriented ultra-high molecular weight polymer thin films. The discussion associated with FIGS. 25 and 26 relates to exemplary virtual reality and augmented reality devices that may include a thermally dissipative optical element as disclosed herein.

Referring to FIG. 1, shown is a cross-sectional schematic view of an optical element (e.g., lens). Optical element 100 includes a body 110 having an outer (world side) surface 120 and an inner (eye side) surface 130. Body 110 can support the transfer of heat therethrough by conduction, whereas the outer surface 120 of optical element 100 can exchange (e.g., emit) heat with the surrounding environment through convection and radiation. In examples where the thermal conductivity of the optical element 100 is low, thermal resistance within the body 110 may effectively restrict heat migration to the outer surface 120. In accordance with various embodiments, an anisotropic ultra-high molecular weight polymer thin film may be formed over the outer surface 120 of optical element 100 and/or over the inner surface 130 of optical element 100.

Figure 2:
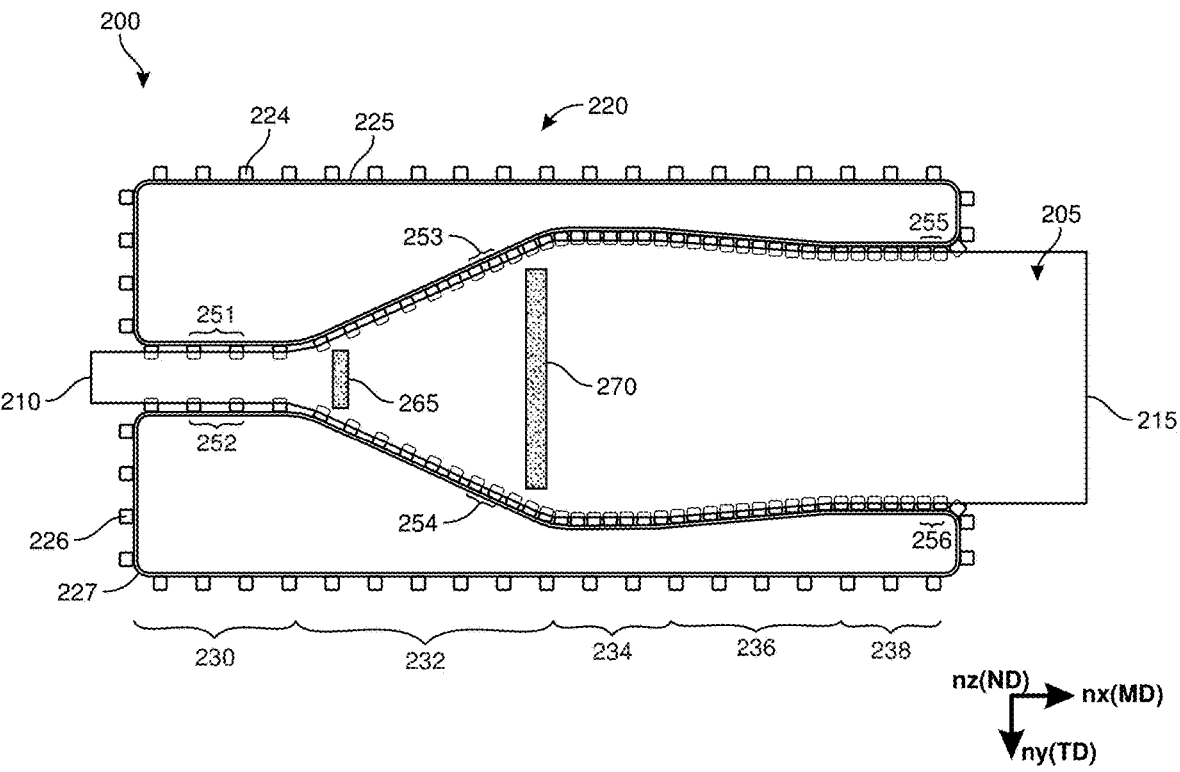
FIG. 2 is a schematic view of a thin film orientation system for manufacturing anisotropic polymer thin films according to some embodiments.

A thin film orientation system for forming an anisotropic polymer thin film is shown schematically in FIG. 2. System 200 may include a thin film input zone 230 for receiving and pre-heating a crystallizable portion 210 of a polymer thin film 205, a thin film output zone 238 for outputting a crystallized and oriented portion 215 of the polymer thin film 205, and a clip array 220 extending between the input zone 230 and the output zone 238 that is configured to grip and guide the polymer thin film 205 through the system 200, i.e., from the input zone 230 to the output zone 238. Clip array 220 may include a plurality of movable first clips 224 that are slidably disposed on a first track 225 and a plurality of movable second clips 226 that are slidably disposed on a second track 227.

Polymer thin film 205 may include a single polymer layer or multiple (e.g., alternating) layers of first and second polymers, such as a multilayer ABAB . . . structure. During operation, proximate to input zone 230, clips 224, 226 may be affixed to respective edge portions of polymer thin film 205, where adjacent clips located on a given track 225, 227 may be disposed at an inter-clip spacing 251, 252, respectively. For simplicity, in the illustrated view, the inter-clip spacing 251 along the first track 225 within input zone 230 may be equivalent or substantially equivalent to the inter-clip spacing 252 along the second track 227 within input zone 230. As will be appreciated, in alternate embodiments, within input zone 230, the inter-clip spacing 251 along the first track 225 may be different than the inter-clip spacing 252 along the second track 227.

In addition to input zone 230 and output zone 238, system 200 may include one or more additional zones 232, 234, 236, etc., where each of: (i) the translation rate of the polymer thin film 205, (ii) the shape of first and second tracks 225, 227, (iii) the spacing between first and second tracks 225, 227, (iv) the inter-clip spacing 251-256, and (v) the local temperature of the polymer thin film 205, etc. may be independently controlled.

In an example process, as it is guided through system 200 by clips 224, 226, polymer thin film 205 may be heated to a selected temperature within each of zones 230, 232, 234, 236, 238. Fewer or a greater number of thermally controlled zones may be used. As illustrated, within zone 232, first and second tracks 225, 227 may diverge along a transverse direction such that polymer thin film 205 may be stretched in the transverse direction while being heated, for example, to a temperature greater than its glass transition temperature ($T_g$) but less than the onset of melting ($T_m$). In some embodiments, a transverse stretch ratio (strain in the transverse direction/strain in the machine direction) may be approximately 8 or greater, e.g., 8, 10, 15, 20, 25, or 30, including ranges between any of the foregoing values.

In accordance with certain embodiments, a polymer thin film may be stretched by a factor of 8 or more without fracture due at least in part to the high molecular weight of its component(s). In particular, high molecular weight polymers allow the thin film to be stretched at higher temperatures, which may decrease chain entanglement and produce a desirable combination of higher modulus, high transparency, and low haze in the stretched thin film.

Referring still to FIG. 2, within zone 232 the spacing 253 between adjacent first clips 224 on first track 225 and the spacing 254 between adjacent second clips 226 on second track 227 may decrease relative to the respective inter-clip spacing 251, 252 within input zone 230. In certain embodiments, the decrease in clip spacing 253, 254 from the initial spacings 251, 252 may scale approximately as the square root of the transverse stretch ratio. The actual ratio may depend on the Poisson's ratio of the polymer thin film as well as the requirements for the stretched thin film, including flatness, thickness, etc. Accordingly, in some embodiments, the in-plane axis of the polymer thin film that is perpendicular to the stretch direction may relax by an amount equal to the square root of the stretch ratio in the stretch direction. By decreasing the clip spacings 253, 254 relative to inter-clip spacings 251, 252, the polymer thin film may be allowed to relax along the machine direction while being stretched along the transverse direction. For instance, the polymer thin film may relax along the machine direction by at least approximately 10% of the Poisson's ratio of the polymer, e.g., 10, 20, 30, 40, 50, 60, 70, or 80% of the Poisson's ratio of the polymer thin film, including ranges between any of the foregoing values.

A temperature of the polymer thin film may be controlled within each heating zone. Within stretching zone 232, for example, a temperature of the polymer thin film 205 may be constant or independently controlled within sub-zones 265, 270, for example. In some embodiments, the temperature of the polymer thin film 205 may be decreased as the stretched polymer thin film 205 enters zone 234. Rapidly decreasing the temperature (i.e., thermal quenching) following the act of stretching within zone 232 may enhance the conformability of the polymer thin film 205. In some embodiments, the polymer thin film 205 may be thermally stabilized, where the temperature of the polymer thin film 205 may be controlled within each of the post-stretch zones 234, 236, 238. A temperature of the polymer thin film may be controlled by forced thermal convection or by radiation, for example, IR radiation, or a combination thereof.

Downstream of stretching zone 232, according to some embodiments, a transverse distance between first track 225 and second track 227 may remain constant or, as illustrated, initially decrease (e.g., within zone 234 and zone 236) prior to assuming a constant separation distance (e.g., within output zone 238). In a related vein, the inter-clip spacing downstream of stretching zone 232 may increase or decrease relative to inter-clip spacing 253 along first track 225 and inter-clip spacing 254 along second track 227. For example, inter-clip spacing 255 along first track 225 within output zone 238 may be less than inter-clip spacing 253 within stretching zone 232, and inter-clip spacing 256 along second track 227 within output zone 238 may be less than inter-clip spacing 254 within stretching zone 232. According to some embodiments, the spacing between the clips may be controlled by modifying the local velocity of the clips on a linear stepper motor line, or by using an attachment and variable clip-spacing mechanism connecting the clips to the corresponding track.

Figure 3:
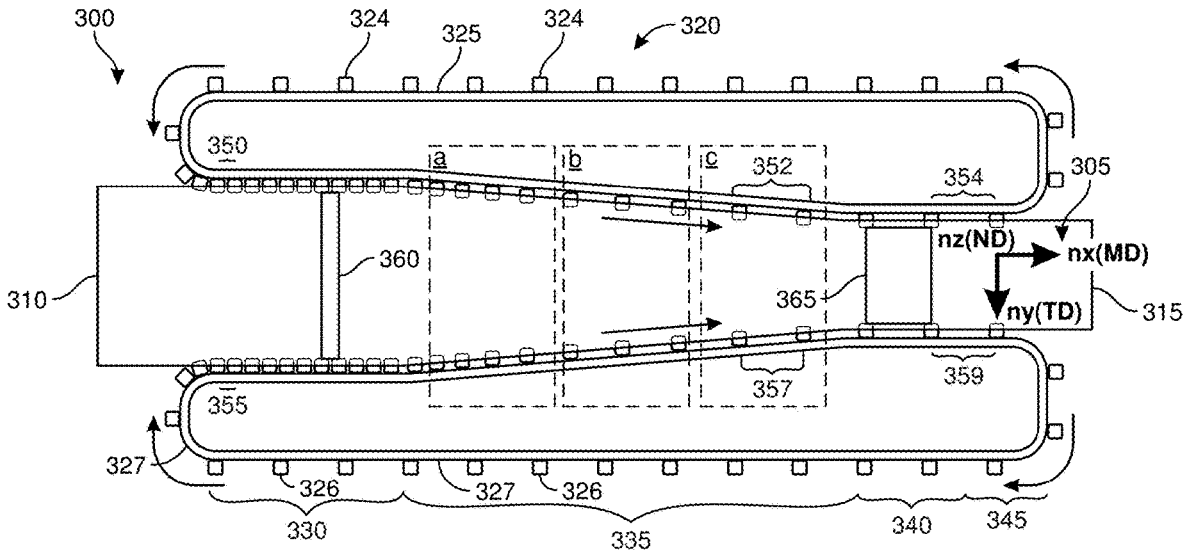
FIG. 3 is a schematic view of a thin film orientation system for manufacturing anisotropic polymer thin films according to some embodiments.

According to some embodiments, the stretched and oriented polymer thin film 215 may be removed from system 200 and further stretched in a subsequent stretching step, such as via length orientation with relaxation as shown in FIG. 3. Referring to FIG. 3, shown is a further example system for forming an anisotropic polymer thin film. Thin film orientation system 300 may include a thin film input zone 330 for receiving and pre-heating a crystalline or crystallizable portion 310 of a polymer thin film 305, a thin film output zone 345 for outputting an at least partially crystallized and oriented portion 315 of the polymer thin film 305, and a clip array 320 extending between the input zone 330 and the output zone 345 that is configured to grip and guide the polymer thin film 305 through the system 300. As in the previous embodiment, clip array 320 may include a plurality of first clips 324 that are slidably disposed on a first track 325 and a plurality of second clips 326 that are slidably disposed on a second track 327. In certain embodiments, crystalline or crystallizable portion 310 may correspond to stretched and oriented polymer thin film 215.

In an example process, proximate to input zone 330, first and second clips 324, 326 may be affixed to edge portions of polymer thin film 305, where adjacent clips located on a given track 325, 327 may be disposed at an initial inter-clip spacing 350, 355, which may be substantially constant or variable along both tracks within input zone 330. Within input zone 330 a distance along the transverse direction between first track 325 and second track 327 may be constant or substantially constant.

System 300 may additionally include one or more zones 335, 340, etc. The dynamics of system 300 allow independent control over: (i) the translation rate of the polymer thin film 305, (ii) the shape of first and second tracks 325, 327, (iii) the spacing between first and second tracks 325, 327 along the transverse direction, (iv) the inter-clip spacing 350, 355 within input zone 330 as well as downstream of the input zone (e.g., inter-clip spacings 352, 354, 357, 329), and (v) the local temperature of the polymer thin film, etc.

In an example process, as it is guided through system 300 by clips 324, 326, polymer thin film 305 may be heated to a selected temperature within each of zones 330, 335, 340, 345. A temperature greater than the glass transition temperature of a component of the polymer thin film 305 may be used during deformation (i.e., within zone 335), whereas a lesser temperature, an equivalent temperature, or a greater temperature may be used within each of one or more downstream zones.

As in the previous embodiment, the temperature of the polymer thin film 305 within stretching zone 335 may be locally controlled. According to some embodiments, the temperature of the polymer thin film 305 may be maintained at a constant or substantially constant value during the act of stretching. According to further embodiments, the temperature of the polymer thin film 305 may be incrementally increased within stretching zone 335. That is, the temperature of the polymer thin film 305 may be increased within stretching zone 335 as it advances along the machine direction. By way of example, the temperature of the polymer thin film 305 within stretching zone 335 may be locally controlled within each of heating zones a, b, and c.

The temperature profile may be continuous, discontinuous, or combinations thereof. As illustrated in FIG. 3, heating zones a, b, and c may extend across the width of the polymer thin film 305, and the temperature within each zone may be independently controlled according to the relationship $T_g < T_a < T_b < T_c < T_m$. A temperature difference between neighboring heating zones may be less than approximately 20° C., e.g., less than approximately 10° C., or less than approximately 5° C.

Referring still to FIG. 3, within zone 335 the spacing 352 between adjacent first clips 324 on first track 325 and the spacing 357 between adjacent second clips 326 on second track 327 may increase relative to respective inter-clip spacings 350, 355 within input zone 330, which may apply an in-plane tensile stress to the polymer thin film 305 and stretch the polymer thin film along the machine direction. The extent of inter-clip spacing on one or both tracks 325, 327 within deformation zone 335 may be constant or variable and, for example, increase as a function of position along the machine direction.

Within stretching zone 335, the inner-clip spacings 352, 357 may increase linearly such that the primary mode of deformation may be at constant velocity. For example, a strain rate of the polymer thin film may decrease along the machine direction. In further embodiments, the polymer thin film 305 may be stretched at a constant strain rate where the inter-clip spacing may increase exponentially.

In certain examples, a progressively decreasing strain rate may be implemented with thin film orientation system 300 to generate a high refractive index and high modulus polymer thin film. For instance, within stretching zone 335 an inter-clip spacing may be configured such that a distance between each successive pair of clips 324, 326 increases along the machine direction. The inter-clip spacing between each successive pair of clips may be independently controlled to achieve a desired strain rate along the machine direction.

In response to the tensile stress applied along the machine direction, first and second tracks 325, 327 may converge along a transverse direction within zone 335 such that polymer thin film 305 may relax in the transverse direction while being stretched in the machine direction. Using a single stretching step or multiple stretching steps, polymer thin film 305 may be stretched by a factor of at least approximately 4 (e.g., 4, 5, 6, 7, 8, 9, 10, 20, 40, 100, or more, including ranges between any of the foregoing values).

Within stretching zone 335, an angle of inclination of first and second tracks 325, 327 (i.e., with respect to the machine direction) may be constant or variable. In particular examples, the inclination angle within stretching zone 335 may decrease along the machine direction. That is, according to certain embodiments, the inclination angle within heating zone a may be greater than the inclination angle within heating zone b, and the inclination angle within heating zone b may be greater than the inclination angle within heating zone c. Such a configuration may be used to provide a progressive decrease in the relaxation rate (along the transverse direction) within the stretching zone 335 as the polymer thin film advances through system 300.

In some embodiments, the temperature of the polymer thin film 305 may be decreased as the stretched polymer thin film 305 exits zone 335. In some embodiments, the polymer thin film 305 may be thermally stabilized, where the temperature of the polymer thin film 305 may be controlled within each of the post-deformation zones 340, 345. A temperature of the polymer thin film may be controlled by forced thermal convection or by radiation, for example, IR radiation, or a combination thereof.

Downstream of deformation zone 335, the inter-clip spacing may increase or remain substantially constant relative to inter-clip spacing 352 along first track 325 and inter-clip spacing 357 along second track 327. For example, inter-clip spacing 354 along first track 325 within output zone 345 may be substantially equal to the inter-clip spacing 352 as the clips exit zone 335, and inter-clip spacing 359 along second track 327 within output zone 345 may be substantially equal to the inter-clip spacing 357 as the clips exit zone 335. Following the act of stretching, polymer thin film 305 may be annealed, for example, within one or more downstream zones 340, 345.

The strain impact of the thin film orientation system 300 is shown schematically by unit segments 360, 365, which respectively illustrate pre- and post-deformation dimensions for a selected area of polymer thin film 305. In the illustrated embodiment, polymer thin film 305 has a pre-stretch width (e.g., along the transverse direction) and a pre-stretch length (e.g., along the machine direction). As will be appreciated, a post-stretch width may be less than the pre-stretch width and a post-stretch length may be greater than the pre-stretch length.

In some embodiments, a roll-to-roll system may be integrated with a thin film orientation system, such as thin film orientation system 200 or thin film orientation system 300, to manipulate a polymer thin film. In further embodiments, a roll-to-roll system may itself be configured as a thin film orientation system. The ultra-high molecular weight polymer thin films may be laminated to one side or both sides of an optical base material or substrate, such as a polycarbonate lens.

Figure 4:
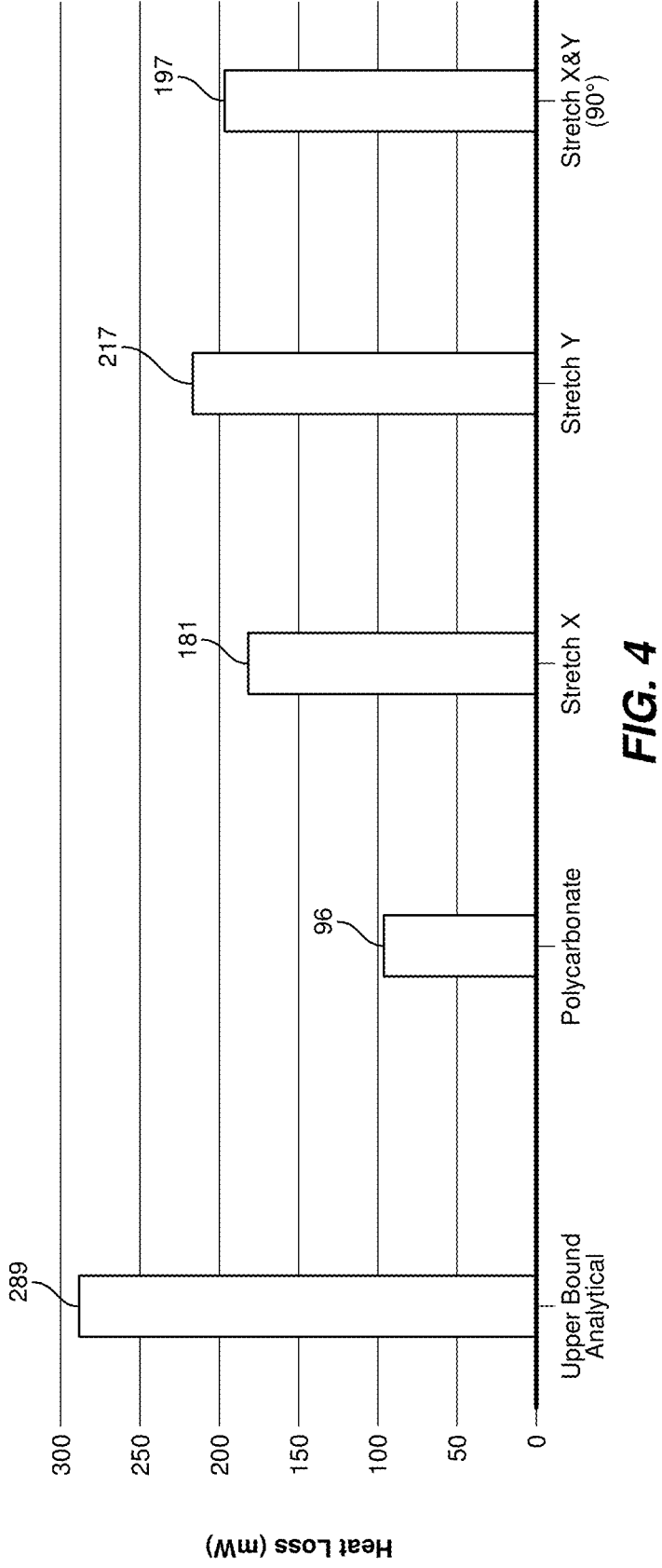
FIG. 4 is a chart comparing heat dissipation from a polycarbonate lens to an optical element that includes a polycarbonate lens laminated with an ultra-high molecular weight polyethylene thin film having various orientations of directed heat flow according to some embodiments.

FIG. 4 compares the theoretical limit of heat transfer from the surface of a polycarbonate lens (surface area=1250 mm², convection heat transfer coefficient=6.5 W/m²K, emissivity=0.9, $T_{surface}$=43° C., $T_{surroundings}$=25° C.) to measured values for a polycarbonate lens and optical elements having a high thermal conductivity ultra-high molecular weight polymer thin film oriented horizontally (Stretch X), vertically (Stretch Y), and as a multi-layer biaxial film (Stretch X&Y, e.g., with one layer oriented horizontally and the other vertically) that are respectively laminated to a polycarbonate lens. The layers in a multilayer stack may have substantially the same thicknesses. In some embodiments, the plural layers in a multilayer may have different thicknesses to tune directional heat dissipation characteristics of the multi-layer. The film thickness(es) and orientation(s) can be adjusted to reduce deformation caused by thermal expansion (CTE).

Assuming a thin film thermal conductivity of 25 W/mK along the alignment direction of crystals within the polymer thin film, the laminated lenses show an increased heat dissipation rate with respect to the polycarbonate lens alone. When the polymer thin film crystals are oriented along the short axis of the lens, in this case the vertical (Stretch Y) direction, the heat dissipation is enhanced by approximately 20% with respect to the case where the polymer thin film crystals are oriented along the long axis of the lens (Stretch X). A multilayer polymer thin film, with orthogonal crystallite orientations, results in heat dissipation rates between the X and Y orientations.

Figure 5:
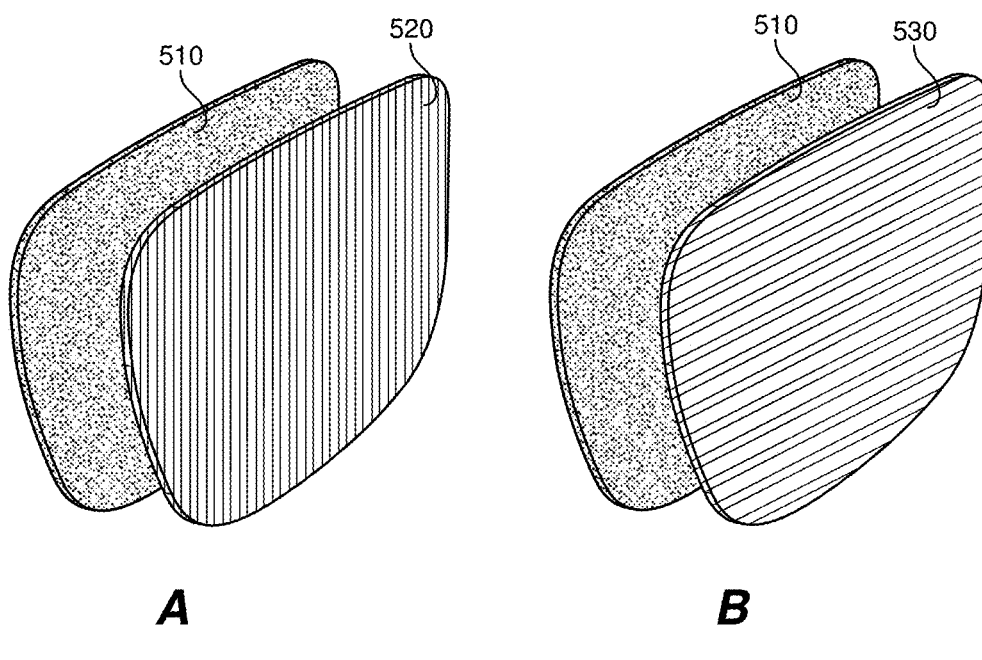
FIG. 5 is a schematic illustration of an optical element including (A) a vertically-oriented high thermal conductivity polymer thin film laminated to a substrate, and (B) a horizontally-oriented high thermal conductivity polymer thin film laminated to a substrate according to various embodiments.
Figure 6:
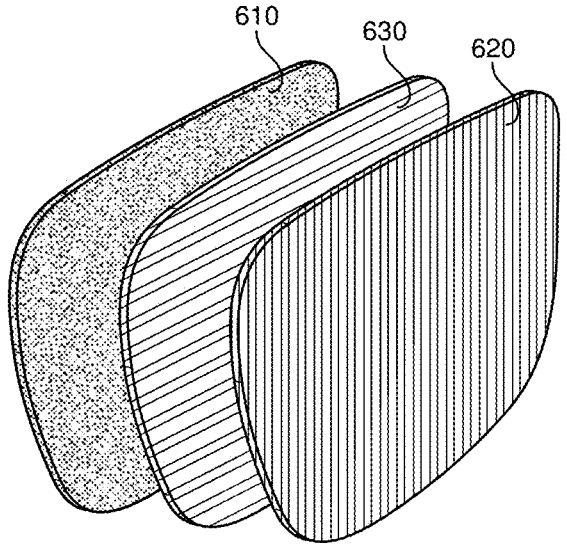
FIG. 6 is a schematic illustration of an optical element including an orthogonally-oriented bilayer high thermal conductivity polymer thin film laminated to a substrate according to some embodiments.

Exploded representations of example optical elements are shown in FIGS. 5 and 6, where FIG. 5A shows a polymer thin film 520 having a vertical orientation of crystals disposed over a substrate 510, FIG. 5B shows a polymer thin film 530 having a horizontal orientation of crystals disposed over a substrate 510, and FIG. 6 shows a clocked multilayer polymer thin film including both a polymer thin film 620 having a vertical orientation of crystals and a polymer thin film 630 having a horizontal orientation of crystals disposed over a substrate 610.

The major surfaces of the substrates 510, 610 may be independently selected from planar, concave, and convex, although further shapes are contemplated. For instance, one or both major surfaces of a substrate may exhibit compound curvature. Substrates 510, 610 may include a lens, for example, such as a polycarbonate or glass lens. In each of the illustrated embodiments, the anisotropic polymer thin film(s) may be disposed over the world side of the lens or the eye side of the lens.

Figure 7:
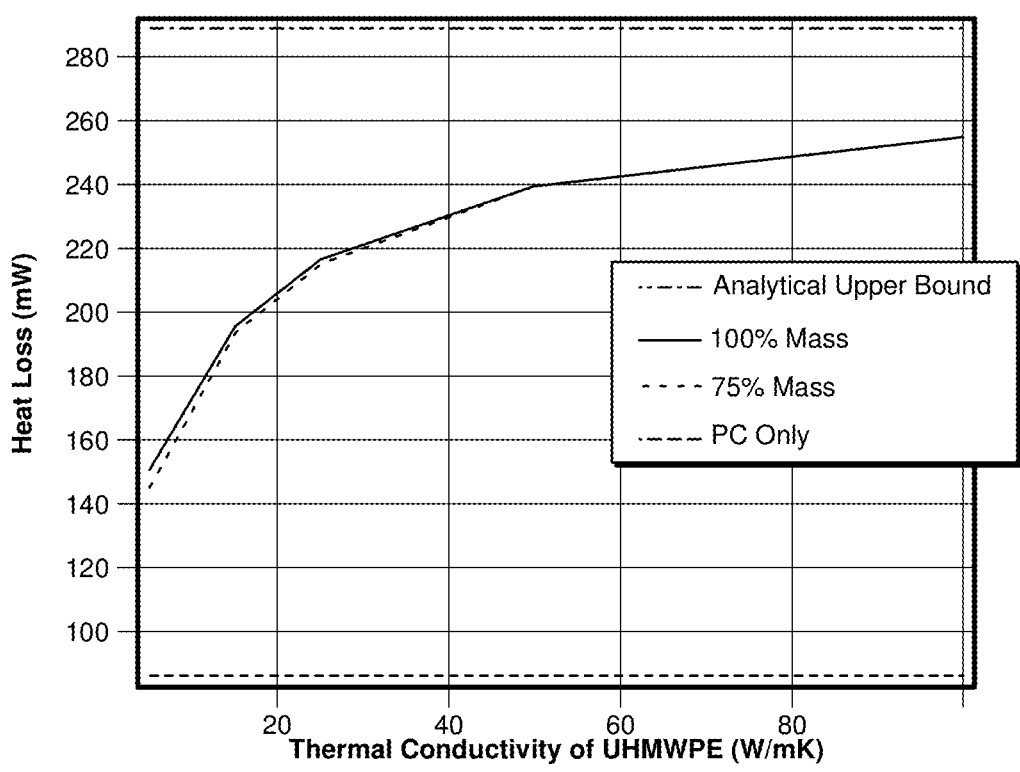
FIG. 7 is a plot of heat dissipation versus thermal conductivity for a comparative polycarbonate substrate and for mass normalized polycarbonate substrates laminated with an ultra-high molecular weight polyethylene thin film according to some embodiments.
Figure 8:
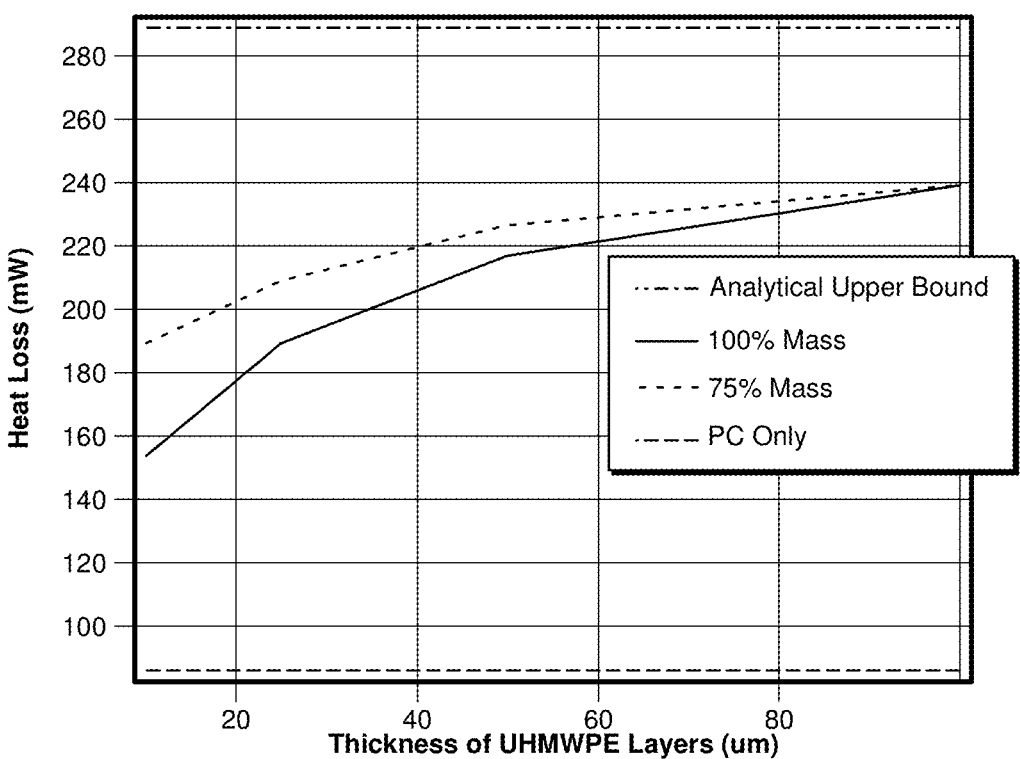
FIG. 8 is a plot of heat dissipation versus thickness for a comparative polycarbonate substrate and for mass normalized polycarbonate substrates laminated with an ultra-high molecular weight polyethylene thin film according to some embodiments.

Referring to FIGS. 7 and 8, Applicants have shown that heat dissipation from a lens laminated with a high thermal conductivity ultra-high molecular weight polymer thin film increases with each of the thermal conductivity and the thickness of the thin film. Heat rejection increases as a function of the thermal conductivity, asymptotically approaching the theoretical limit set by convective and radiative heat transfer. Referring to FIG. 7, the heat dissipation rate achieves approximately 63% and 82% of the theoretical maximum at 25 and 100 W/mK, respectively. Referring to FIG. 8, decreasing the mass of the polycarbonate substrate by 25%, has little effect on the overall heat dissipation rate.

In various examples, the designation "PC Only" refers to a polycarbonate substrate prior to lamination with a high thermal conductivity ultra-high molecular weight polyethylene thin film. The designations "100% Mass," "75% Mass," and "50% Mass" refer to composite structures that include a high thermal conductivity ultra-high molecular weight polyethylene thin film laminated to a polycarbonate substrate where, for the purposes of comparison, the substrate is thinned so that the mass of the composite is a fixed percentage (100%, 75%, or 50%) of the mass of the original "PC only" substrate.

Figures 9, 10:
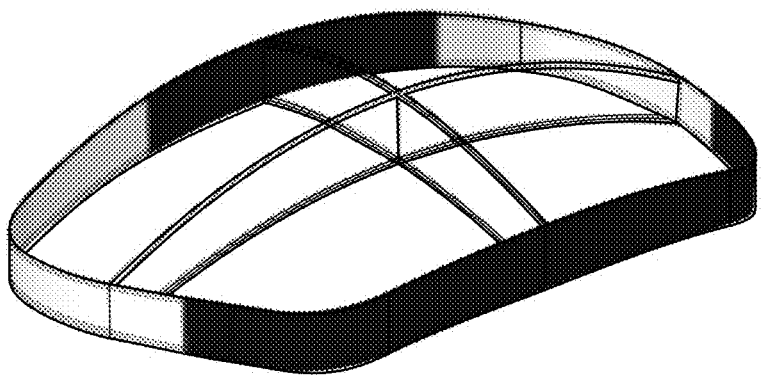
FIG. 9. is a table summarizing the maximum temperature across the outward facing surface of various lens architectures according to various embodiments.
FIG. 10 is a perspective illustration of an optical element showing a segmented heat flux boundary condition according to certain embodiments.
Figure 11:
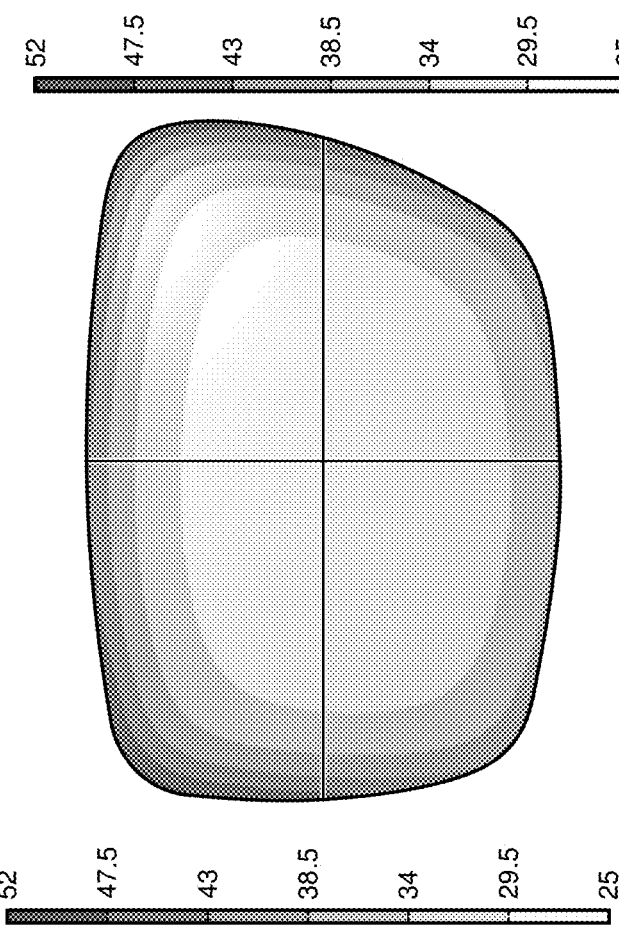
FIG. 11 shows the temperature profile for a comparative polycarbonate lens according to some embodiments.
Figure 11:
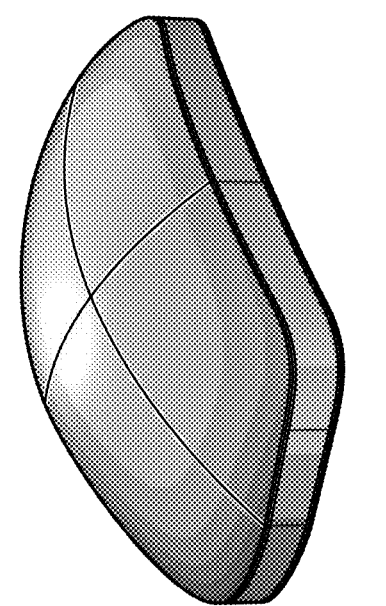

FIG. 9 shows that the lamination of a high thermal conductivity ultra-high molecular weight polymer thin film to a polycarbonate (PC) substrate may decrease the temperature gradient across the substrate and significantly improve heat dissipation therefrom. Referring to FIG. 10, shown is a segmented ring boundary condition where 100 mW of heat is distributed in the unshaded bands, while the shaded bands emit no heat.

Figure 12:
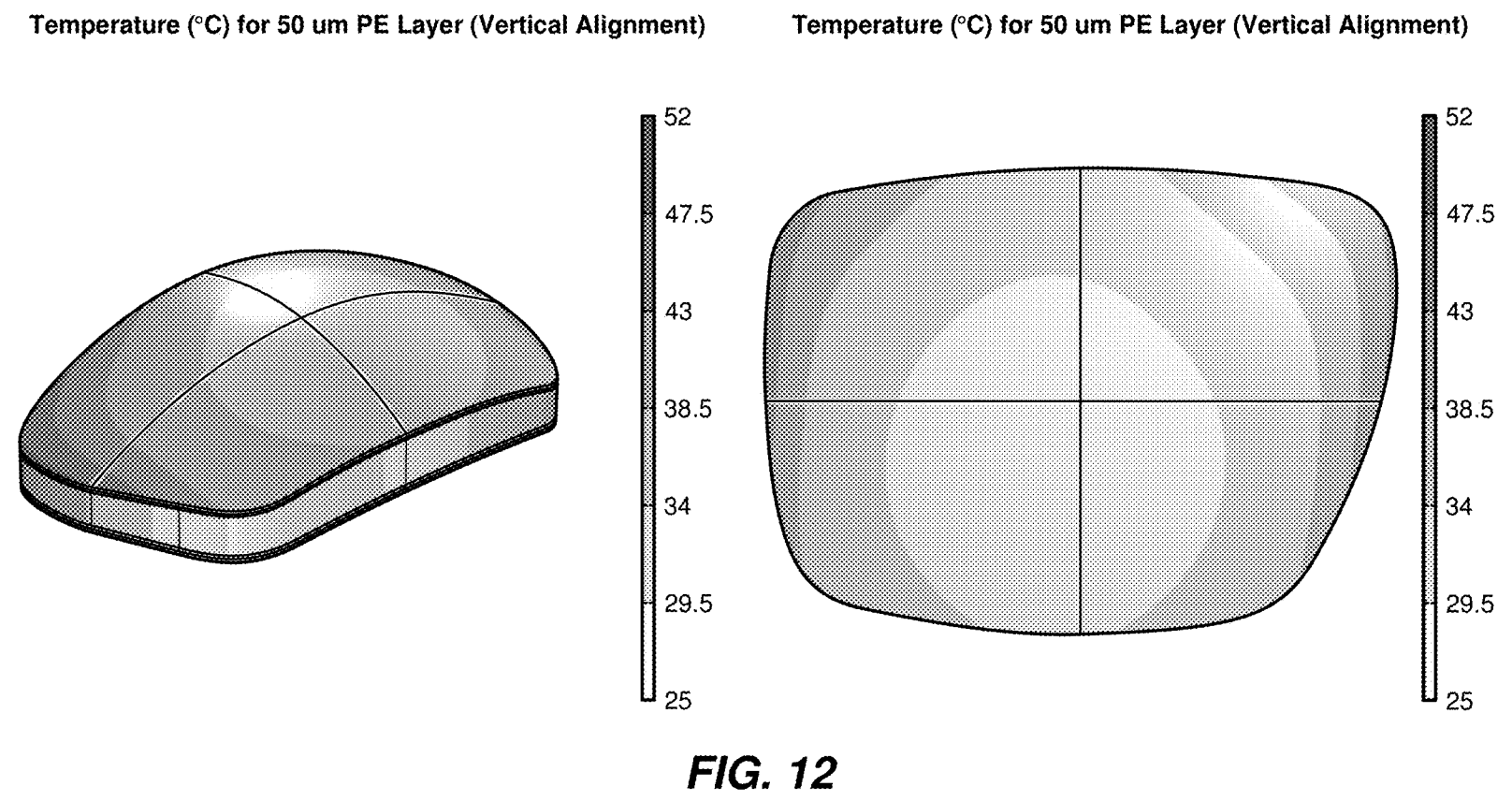
Figure 13:
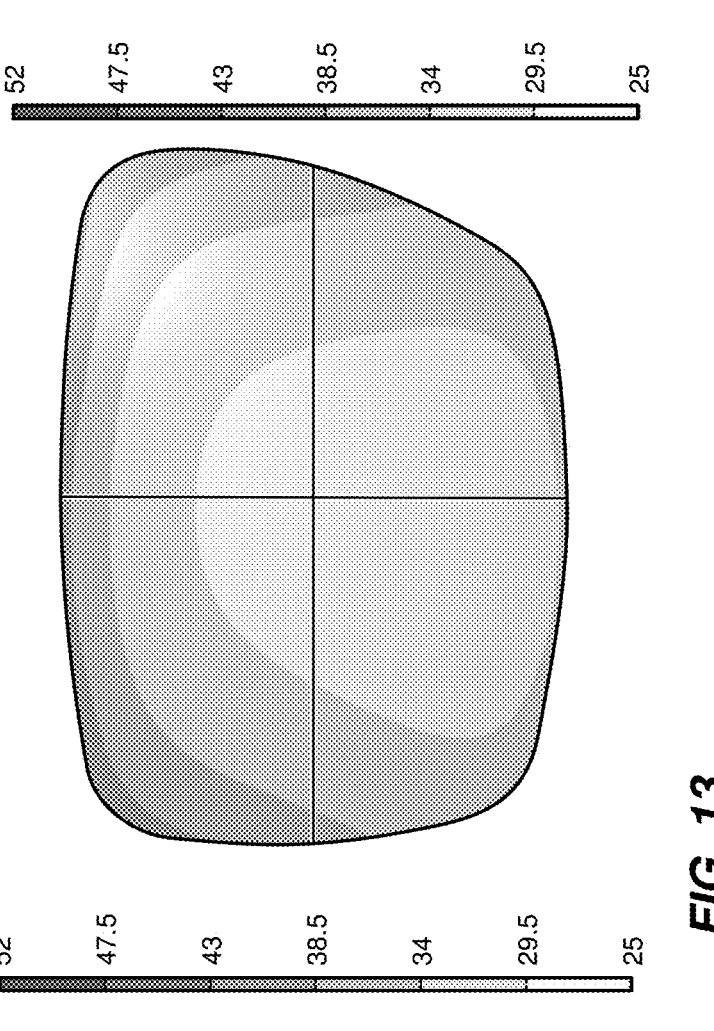
FIG. 13 shows the temperature profile for an optical element having a horizontally-oriented high thermal conductivity ultra-high molecular weight polymer thin film laminated to each major surface of the polycarbonate lens of FIG. 11 according to some embodiments.
Figure 13:
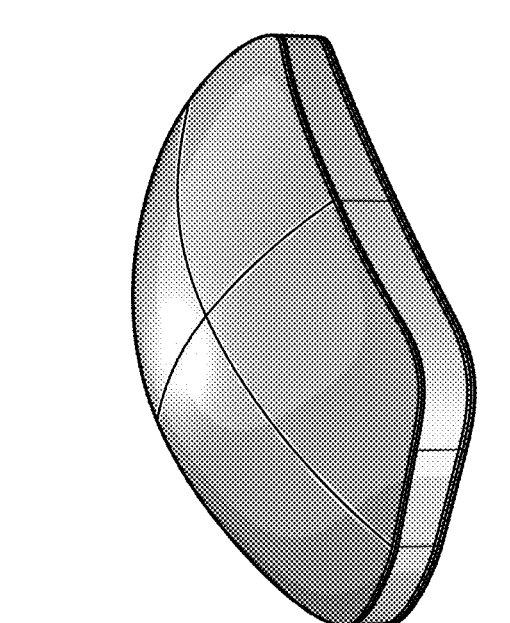
Figure 14:
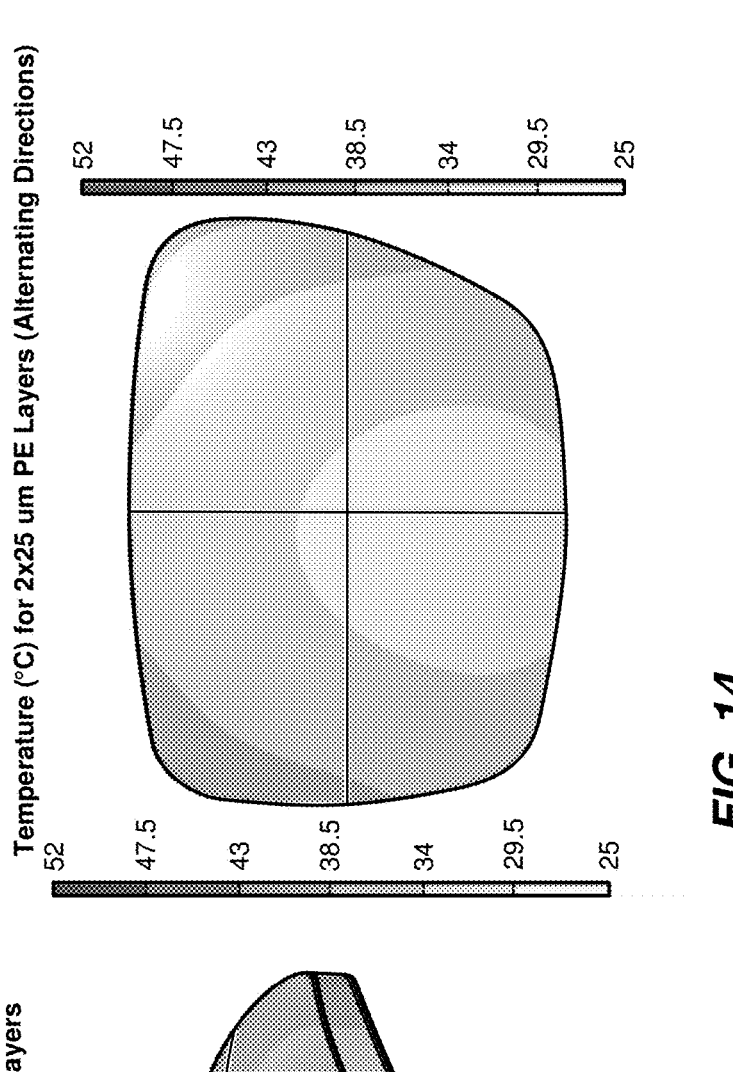
FIG. 14 shows the temperature profile for an optical element having a multilayer high thermal conductivity ultra-high molecular weight polymer thin film laminated to each major surface of the polycarbonate lens of FIG. 11 according to some embodiments.
Figure 14:
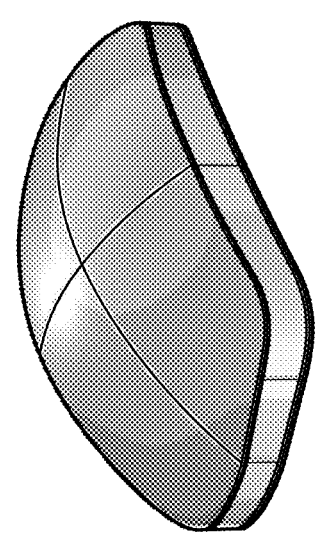

Referring to FIGS. 11-14, shown graphically are the data from FIG. 9. For a comparative polycarbonate lens (FIG. 11), the maximum surface temperature of the lens is approximately 52° C., and the standard deviation is approximately 5.3° C. Referring to FIGS. 12 and 13, the application of a 50 μm thick ultra-high molecular weight polymer thin film having a 25 W/mK anisotropic thermal conductivity aligned either vertically (FIG. 12) or horizontally (FIG. 13) decreases the maximum surface temperature of the lens to approximately 44° C. with a standard deviation of approximately 3.4° C. In the case where two 25 μm ultra-high molecular weight polymer thin film layers are applied with mutually orthogonal axes (FIG. 14), the maximum surface temperature is decreased to approximately 39° C. with a standard deviation of approximately 2.4° C.

Figure 15:
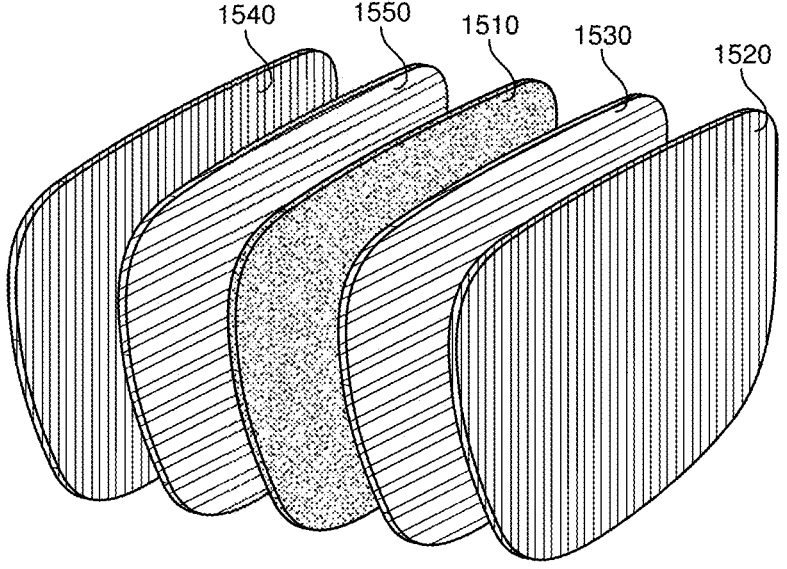
FIG. 15 is a schematic illustration of an optical element that includes a core substrate disposed between a pair of orthogonally-oriented bilayer polymer thin films according to further embodiments.

FIG. 15 is a schematic illustration of an optical element that includes a core substrate 1510 sandwiched between two clocked)(Θ=90° multilayer polymer thin films according to further embodiments. As shown, a multilayer polymer thin film disposed on a first side (i.e., a front side or world side) of substrate 1510 may include, for example, a polymer thin film 1520 having a vertical orientation of crystals and a polymer thin film 1530 having a horizontal orientation of crystals. Additionally, a multilayer polymer thin film disposed on a second side (i.e., a back side or eye side) of substrate 1510 may include, for example, a polymer thin film 1540 having a vertical orientation of crystals and a polymer thin film 1550 having a horizontal orientation of crystals.

Figure 16:
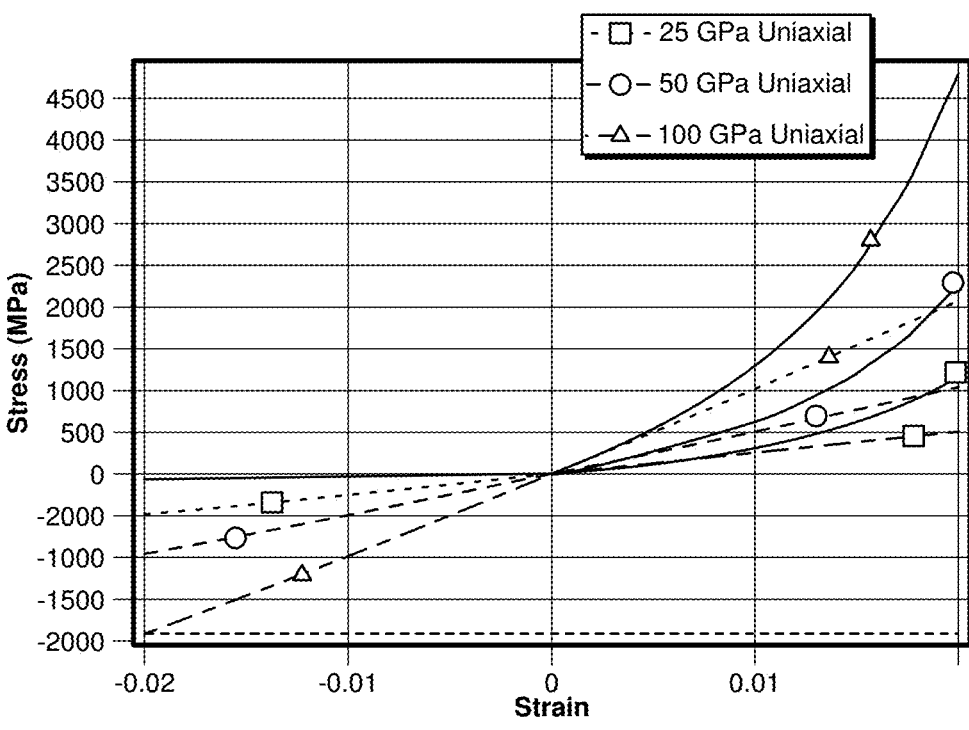
FIG. 16 is a plot of stress versus strain for different ultra-high molecular weight polyethylene thin films according to some embodiments.

FIG. 16 is a plot of stress versus strain for different ultra-high molecular weight polyethylene thin films according to some embodiments. As illustrated, the ability of a polymer thin film to resist strain and deformation is increased with a higher modulus of elasticity. The resulting stress-strain curve for ultra-high molecular weight polyethylene thin films having the ability to hold tension alone is curved and sloping upward as illustrated (the straight dashed lines represent conceptual thin films having the ability to hold both tension and compression).

Figure 17:
FIG. 17 shows a pressure profile of an optical element having an anisotropic multilayer polymer thin film laminated over a surface of a polycarbonate core substrate in response to an applied load according to some embodiments.

FIG. 17 shows a pressure profile of an optical element in response to a 19 N load applied to a centralized surface (5 mm diameter circle) thereof. The optical element includes an anisotropic multilayer polymer thin film having a high modulus of elasticity laminated over a surface of a polycarbonate core substrate. As shown, the pressure is localized and does not propagate substantially to surrounding regions of the lens.

Figure 18:
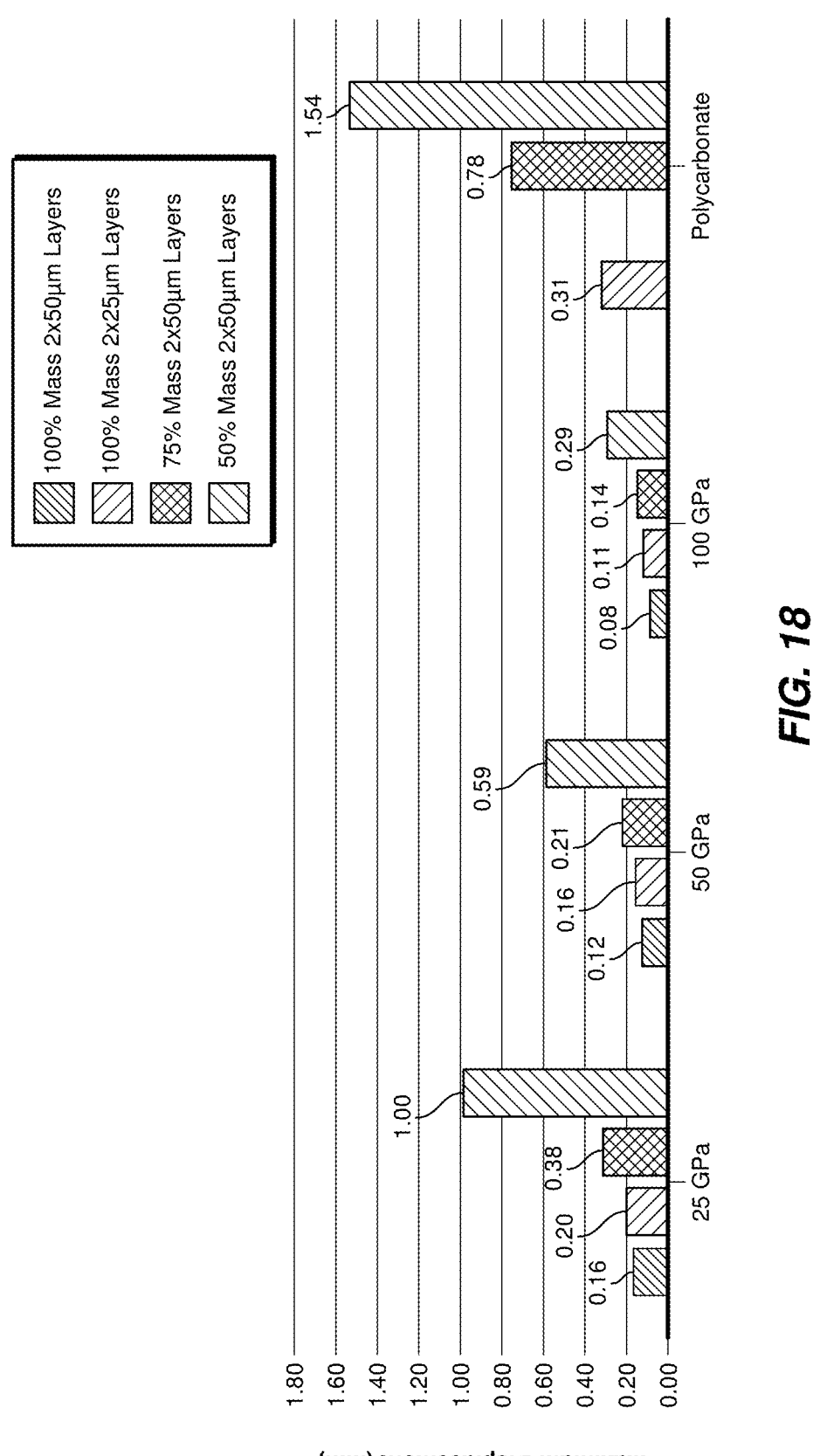
FIG. 18 is a chart showing maximum modeled lens displacements, in response to an applied load, of polycarbonate lenses in comparison to optical elements having polycarbonate lenses laminated with various combinations of anisotropic ultra-high molecular weight polyethylene thin films having a high modulus of elasticity according to some embodiments.
Figure 19:
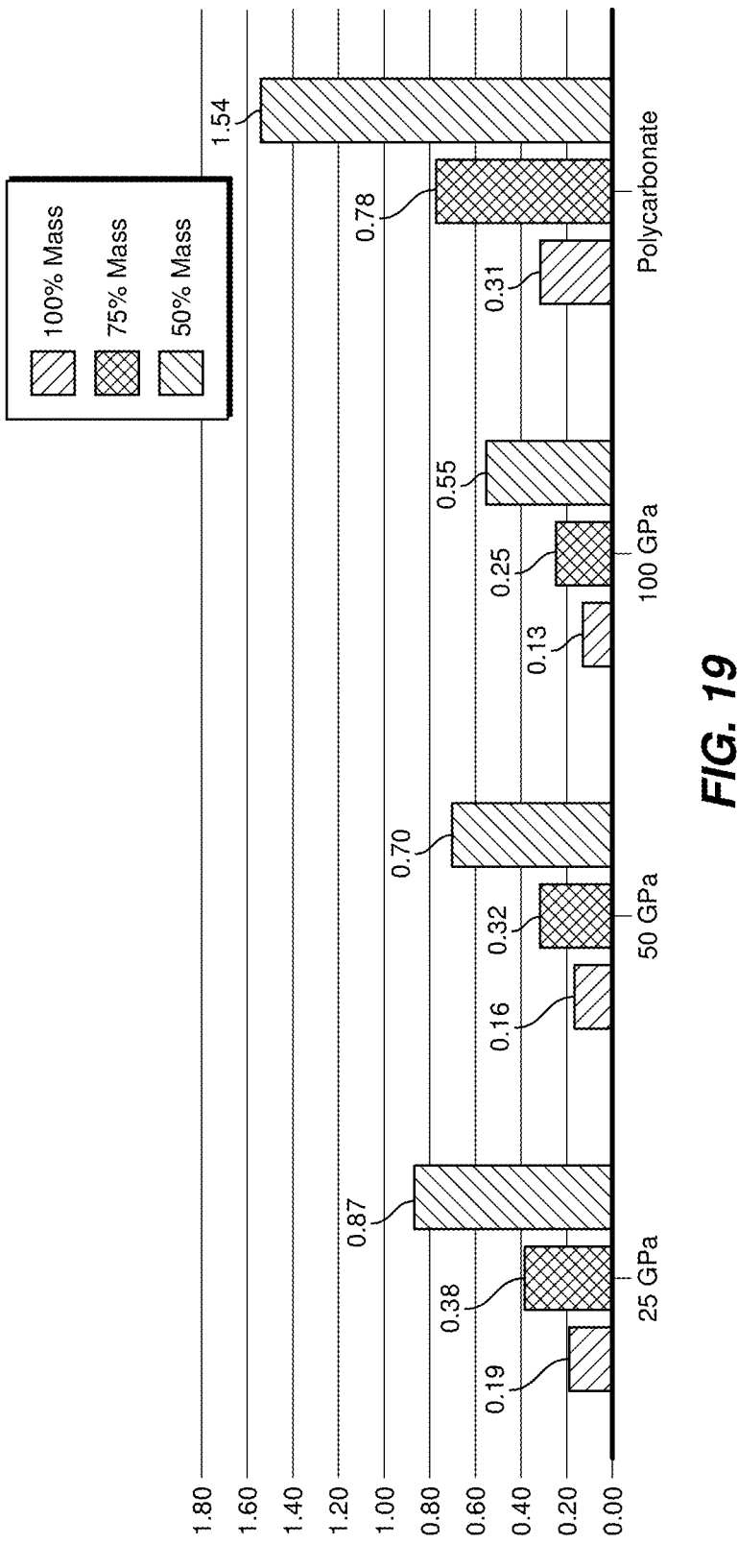
FIG. 19 is a chart showing maximum modeled lens displacements, in response to an applied load, of polycarbonate lenses in comparison to optical elements having polycarbonate lenses laminated with anisotropic ultra-high molecular weight polyethylene thin films having a high modulus of elasticity according to some embodiments.
Figure 20:
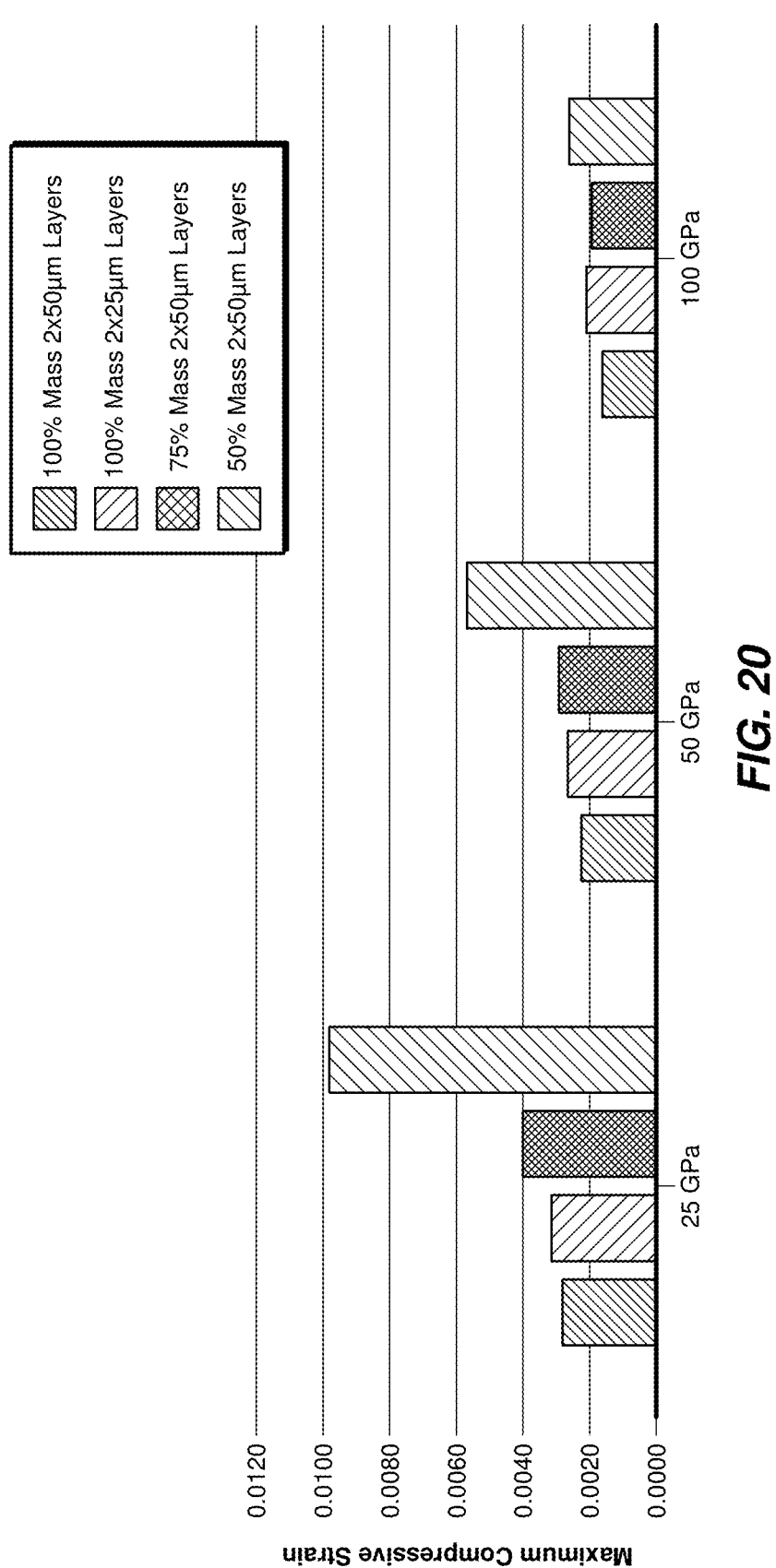
FIG. 20 is a chart showing maximum compressive strains, in response to an applied load, of optical elements having polycarbonate lenses laminated with various combinations of anisotropic ultra-high molecular weight polyethylene thin films having a high modulus of elasticity according to some embodiments.
Figure 21:
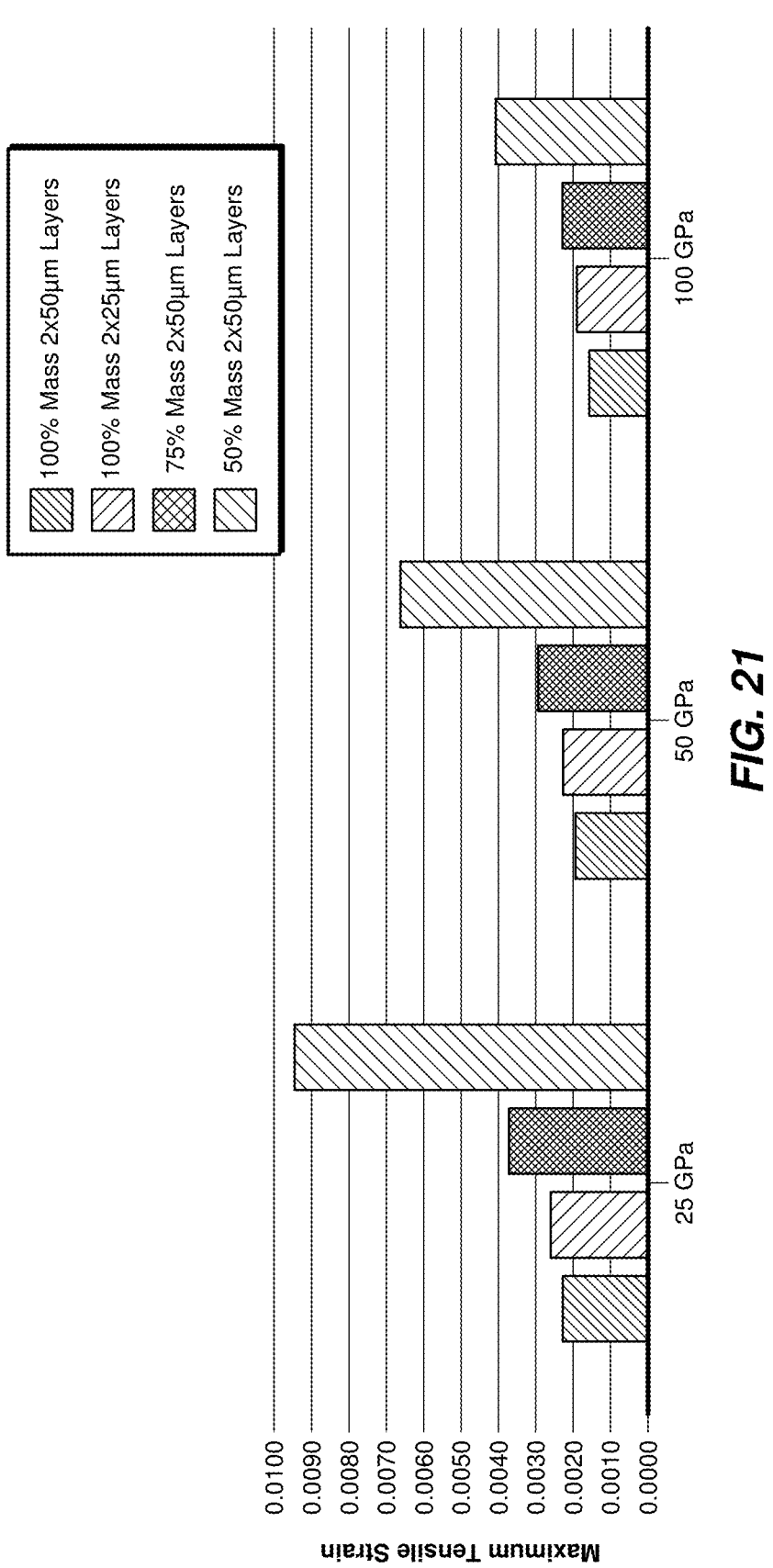
FIG. 21 is a chart showing maximum tensile strains, in response to an applied load, of optical elements having polycarbonate lenses laminated with various combinations of anisotropic ultra-high molecular weight polyethylene thin films having a high modulus of elasticity according to some embodiments.

Referring to FIGS. 18 and 19, Applicants have shown that, in response to an applied load, the maximum displacement of polycarbonate lenses laminated with various combinations of anisotropic films having a high modulus of elasticity is significantly reduced in comparison to polycarbonate lenses alone. The data shown in FIGS. 18 and 19 was obtained using a Holzapfel-Gasser-Ogden (HGO) material model that assumes the anisotropic films can accommodate tensile loads but not compressive loads (see, e.g., the solid stress-strain curves shown in FIG. 16). Referring to FIGS. 20 and 21, Applicants have shown that the maximum compressive and tensile strain, respectively, in response to an applied load, is decreased in anisotropic films having a higher modulus of elasticity.

Figure 22:
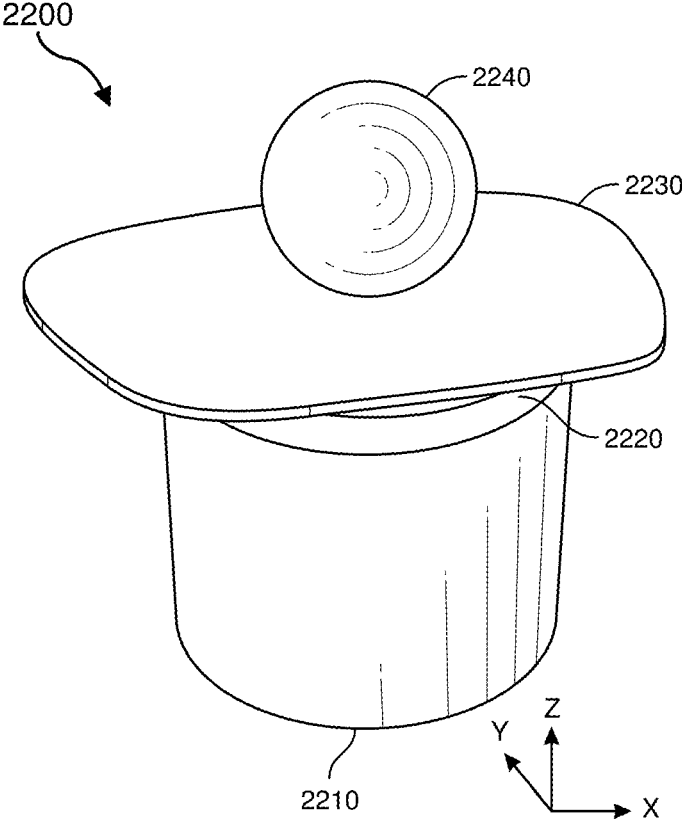
FIG. 22 is a perspective illustration of an assembly for performing a ball drop test on an optical element according to certain embodiments.

FIG. 22 is a perspective illustration of an assembly for performing a ball drop test on an optical element. As shown, the test assembly 2200 includes a base 2210 and a neoprene gasket 2220 for supporting a lens 2230 or another optical element. A steel ball 2240 is dropped from a specified height onto the supported lens 2230 and a maximum principal stress and lens deflection may be measured during the ball drop.

Figure 23:
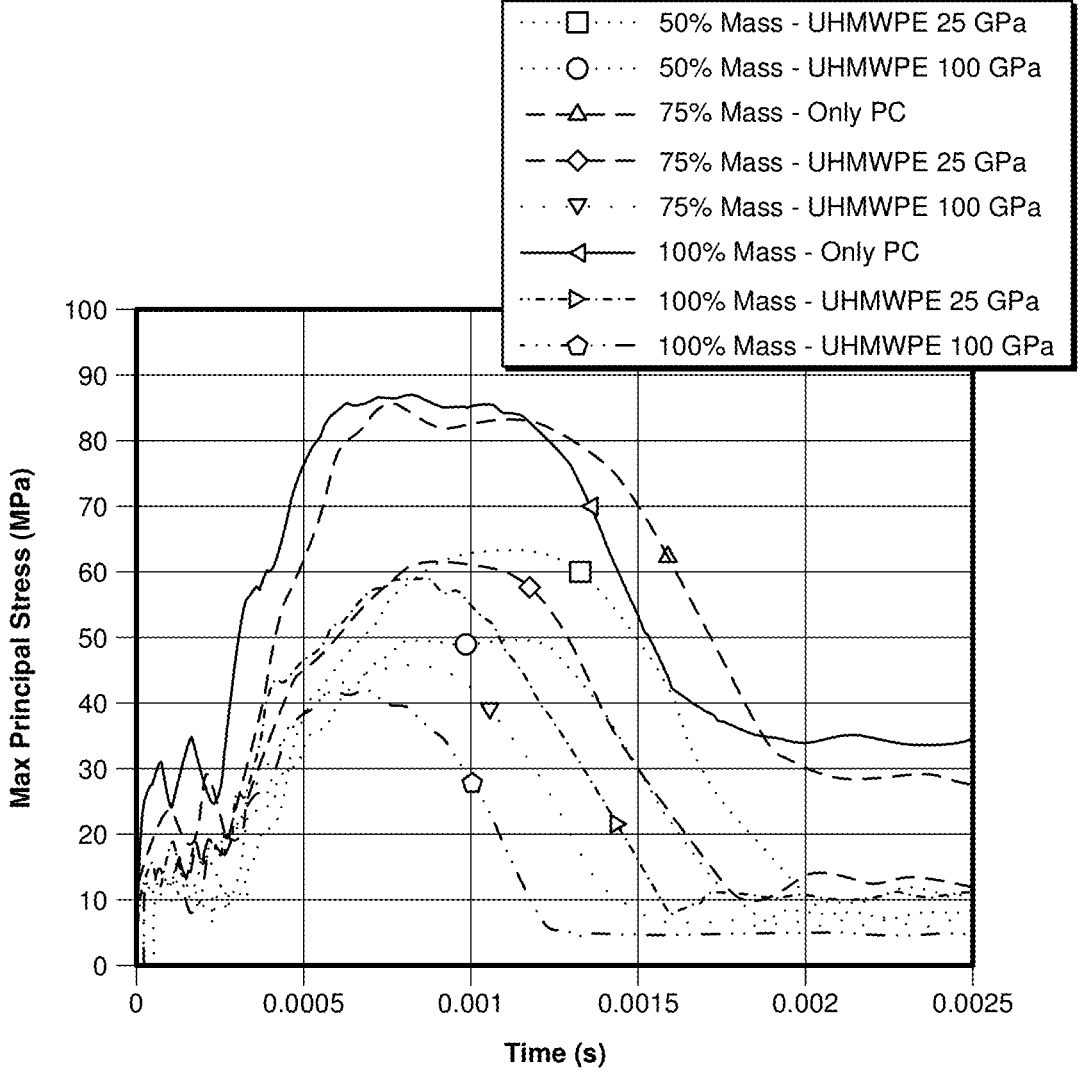
FIG. 23 is a plot of maximum principal stress versus time for polycarbonate lenses and optical elements having polycarbonate lenses laminated with various combinations of anisotropic ultra-high molecular weight polyethylene thin films having a high modulus of elasticity according to certain embodiments.

Referring to FIG. 23, Applicants have shown that the maximum principal stress over time, during a ball drop test, is greatly reduced for polycarbonate lenses laminated with ultra-high molecular weight polymer thin films having a high modulus of elasticity in comparison to polycarbonate lenses alone.

Figure 24:
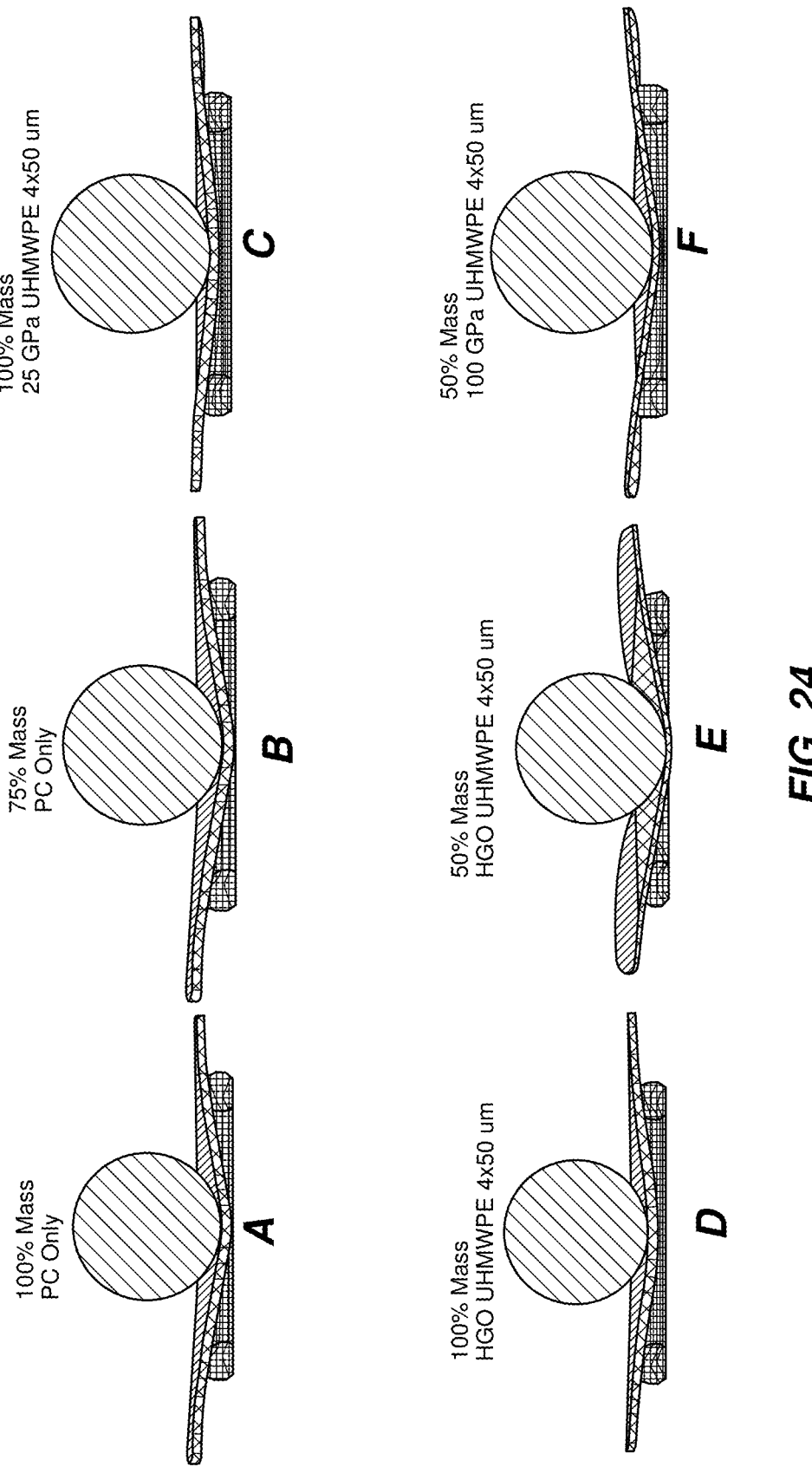
FIG. 24 includes schematic illustrations showing deflections of polycarbonate lenses in comparison to optical elements having polycarbonate lenses laminated with various combinations of anisotropic ultra-high molecular weight polyethylene thin films having a high modulus of elasticity according to certain embodiments.

Referring to FIG. 24, Applicants have shown that the deflection, during a ball drop test, of polycarbonate lenses laminated with ultra-high molecular weight polymer thin films having a high modulus of elasticity is reduced in comparison to polycarbonate lenses alone.

An ultra-high molecular weight polymer thin film may be light-weight, transparent, and low haze, and may additionally have a high thermal conductivity along at least one dimension so as to facilitate heat dissipation and temperature uniformity therethrough. An optical element, such as a lens, may include a free-standing ultra-high molecular weight polymer thin film or multilayer, or an ultra-high molecular weight polymer thin film or multilayer disposed over (e.g., laminated to) a substrate. A substrate may include a glass, ceramic, polymer, or other optically transparent structure.

During manufacture, stretching of an ultra-high molecular weight polymer thin film may induce an alignment of polymer chains or crystallites within the film and an attendant in-plane anisotropy of the film's properties, including refractive index, modulus, and thermal conductivity. In certain embodiments, an optical element including such a polymer thin film may be configured to dissipate heat, i.e., heat emanating from a light emitter, without disrupting the optical performance of an associated device or system. Through thermal balancing, user comfort, usability, and device performance and lifetime may be improved.

The present disclosure also describes manufacturing methods for producing a thin, stiff, and low density polymer film that is configured to decrease the thickness and mass of a lens formed therefrom. A decrease in lens size and weight may be accomplished without sacrificing stiffness and strength. Specifically, disclosed is a lamination method for forming an optical element from an anisotropic, high modulus, and high strength polymer thin film composed of ultra-high molecular weight polyethylene.

EXAMPLE EMBODIMENTS

Example 1: A polymer thin film includes polyethylene having a weight average molecular weight of at least approximately 500,000 g/mol, where the thin film is characterized by transparency within the visible spectrum of at least approximately 80%, bulk haze of less than approximately 5%, and an in-plane elastic modulus of at least approximately 10 GPa.

Example 2: The polymer thin film of Example 1, characterized by transparency within the infrared spectrum of at least approximately 80%.

Example 3: The polymer thin film of any of Examples 1 and 2, characterized by transparency within the radio frequency spectrum of at least approximately 80%.

Example 4: The polymer thin film of any of Examples 1-3, characterized by an in-plane tensile strength of at least approximately 0.5 GPa.

Example 5: The polymer thin film of any of Examples 1-4, where an in-plane thermal conductivity of the thin film is anisotropic.

Example 6: The polymer thin film of any of Examples 1-5, characterized by an in-plane thermal conductivity of at least approximately 5 W/mK.

Example 7: The polymer thin film of any of Examples 1-6, where an in-plane anisotropy of the thermal conductivity is at least 2:1.

Example 8: The polymer thin film of any of Examples 1-7, characterized by a crystalline polyethylene content of at least approximately 30%.

Example 9: The polymer thin film of any of Examples 1-8, where a density of the polyethylene is less than approximately 1.5 g/cm³.

Example 10: The polymer thin film of any of Examples 1-9, characterized by a thickness of at least approximately 5 micrometers.

Example 11: A thin film includes a crystalline polymer having a weight average molecular weight of at least approximately 500,000 g/mol and a preferred in-plane orientation of crystalline axes, where the thin film is characterized by at least two attributes (i-iv) selected from (i) transparency within the visible spectrum of at least approximately 80%, (ii) bulk haze of less than approximately 5%, (iii) an in-plane elastic modulus of at least approximately 10 GPa, and (iv) an in-plane thermal conductivity of at least approximately 5 W/mK.

Example 12: The thin film of Example 11, where the thin film is characterized by at least three of the attributes (i-iv).

Example 13: The thin film of any of Examples 11 and 12, characterized by a crystalline polymer content of at least approximately 30%.

Example 14: The thin film of any of Examples 11-13, where a density of the crystalline polymer is less than approximately 1.5 g/cm³.

Example 15: The thin film of any of Examples 11-14, where the crystalline polymer includes polyethylene.

Example 16: An optical element includes a substrate and a first anisotropic polymer thin film laminated to a first major surface of the substrate, where the first anisotropic polymer thin film includes a preferred in-plane orientation of crystalline axes and is characterized by transparency within the visible spectrum of at least approximately 80%, bulk haze of less than approximately 5%, and an in-plane elastic modulus of at least approximately 10 GPa.

Example 17: The optical element of Example 16, including a second anisotropic polymer thin film laminated to the first anisotropic polymer thin film, where the second anisotropic polymer thin film includes a preferred in-plane orientation of crystalline axes such that the crystalline axes of the first and second anisotropic polymer thin films are rotationally misoriented in-plane by an angle (θ), where 0<θ≤90°, and the second anisotropic polymer thin film is characterized by transparency within the visible spectrum of at least approximately 80%, bulk haze of less than approximately 5%, and an in-plane elastic modulus of at least approximately 10 GPa.

Example 18: The optical element of any of Examples 16 and 17, where the first and second anisotropic polymer thin films form a polymer bilayer, and the polymer bilayer is characterized by transparency within the visible spectrum of at least approximately 80%, bulk haze of less than approximately 5%, and an in-plane elastic modulus of at least approximately 10 GPa.

Example 19: The optical element of any of Examples 16-18, including a third anisotropic polymer thin film laminated to a second major surface of the substrate, where the third anisotropic polymer thin film includes a preferred in-plane orientation of crystalline axes and is characterized by transparency within the visible spectrum of at least approximately 80%, bulk haze of less than approximately 5%, an in-plane elastic modulus of at least approximately 10 GPa, and an in-plane thermal conductivity of at least approximately 5 W/mK.

Example 20: The optical element of any of Examples 16-19, where the substrate includes a lens and the first major surface is an eye side surface of the lens.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 2500 in FIG. 25) or that visually immerses a user in an artificial reality (such as, e.g., virtual-reality system 2600 in FIG. 26). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 25:
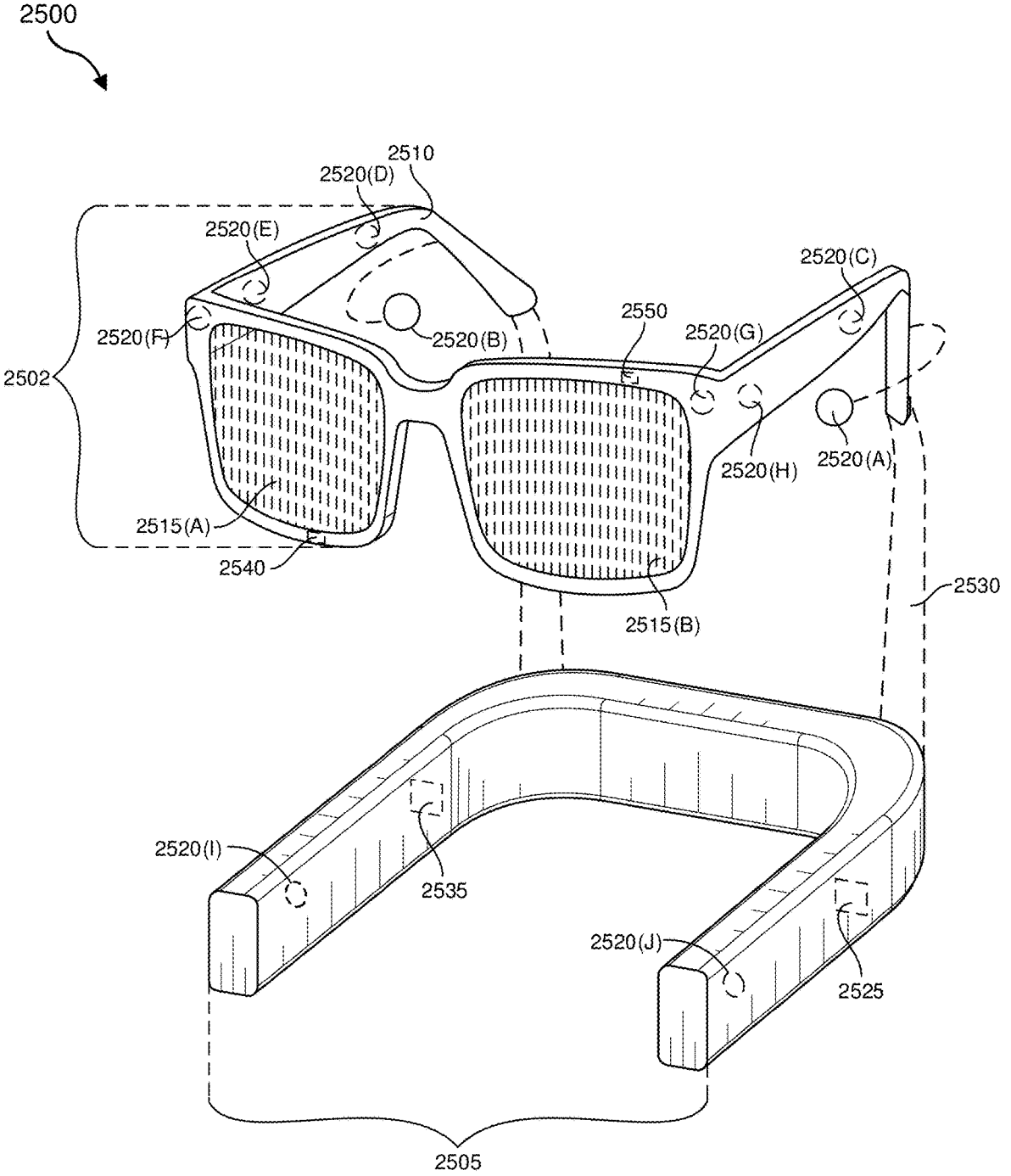
FIG. 25 is an illustration of exemplary augmented-reality glasses that may be used in connection with embodiments of this disclosure.
Figure 26:
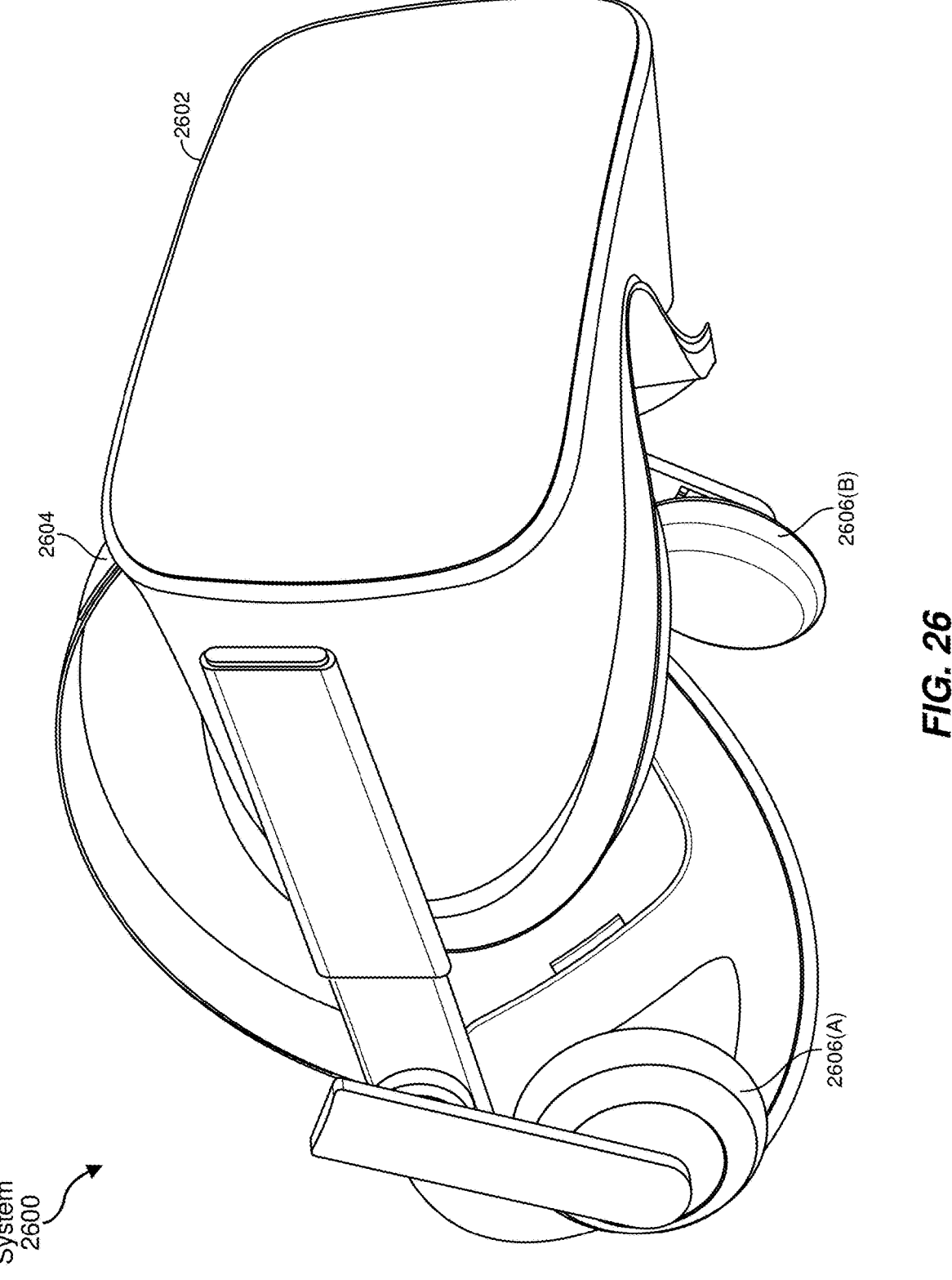
FIG. 26 is an illustration of an exemplary virtual-reality headset that may be used in connection with embodiments of this disclosure.

Turning to FIG. 25, augmented-reality system 2500 may include an eyewear device 2502 with a frame 2510 configured to hold a left display device 2515(A) and a right display device 2515(B) in front of a user's eyes. Display devices 2515(A) and 2515(B) may act together or independently to present an image or series of images to a user. While augmented-reality system 2500 includes two displays, embodiments of this disclosure may be implemented in augmented-reality systems with a single NED or more than two NEDs.

In some embodiments, augmented-reality system 2500 may include one or more sensors, such as sensor 2540. Sensor 2540 may generate measurement signals in response to motion of augmented-reality system 2500 and may be located on substantially any portion of frame 2510. Sensor 2540 may represent one or more of a variety of different sensing mechanisms, such as a position sensor, an inertial measurement unit (IMU), a depth camera assembly, a structured light emitter and/or detector, or any combination thereof. In some embodiments, augmented-reality system 2500 may or may not include sensor 2540 or may include more than one sensor. In embodiments in which sensor 2540 includes an IMU, the IMU may generate calibration data based on measurement signals from sensor 2540. Examples of sensor 2540 may include, without limitation, accelerometers, gyroscopes, magnetometers, other suitable types of sensors that detect motion, sensors used for error correction of the IMU, or some combination thereof.

In some examples, augmented-reality system 2500 may also include a microphone array with a plurality of acoustic transducers 2520(A)-2520(J), referred to collectively as acoustic transducers 2520. Acoustic transducers 2520 may represent transducers that detect air pressure variations induced by sound waves. Each acoustic transducer 2520 may be configured to detect sound and convert the detected sound into an electronic format (e.g., an analog or digital format). The microphone array in FIG. 25 may include, for example, ten acoustic transducers: 2520(A) and 2520(B), which may be designed to be placed inside a corresponding ear of the user, acoustic transducers 2520(C), 2520(D), 2520(E), 2520(F), 2520(G), and 2520(H), which may be positioned at various locations on frame 2510, and/or acoustic transducers 2520(I) and 2520(J), which may be positioned on a corresponding neckband 2505.

In some embodiments, one or more of acoustic transducers 2520(A)-(J) may be used as output transducers (e.g., speakers). For example, acoustic transducers 2520(A) and/or 2520(B) may be earbuds or any other suitable type of headphone or speaker.

The configuration of acoustic transducers 2520 of the microphone array may vary. While augmented-reality system 2500 is shown in FIG. 25 as having ten acoustic transducers 2520, the number of acoustic transducers 2520 may be greater or less than ten. In some embodiments, using higher numbers of acoustic transducers 2520 may increase the amount of audio information collected and/or the sensitivity and accuracy of the audio information. In contrast, using a lower number of acoustic transducers 2520 may decrease the computing power required by an associated controller 2550 to process the collected audio information. In addition, the position of each acoustic transducer 2520 of the microphone array may vary. For example, the position of an acoustic transducer 2520 may include a defined position on the user, a defined coordinate on frame 2510, an orientation associated with each acoustic transducer 2520, or some combination thereof.

Acoustic transducers 2520(A) and 2520(B) may be positioned on different parts of the user's ear, such as behind the pinna, behind the tragus, and/or within the auricle or fossa. Or, there may be additional acoustic transducers 2520 on or surrounding the ear in addition to acoustic transducers 2520 inside the ear canal. Having an acoustic transducer 2520 positioned next to an ear canal of a user may enable the microphone array to collect information on how sounds arrive at the ear canal. By positioning at least two of acoustic transducers 2520 on either side of a user's head (e.g., as binaural microphones), augmented-reality device 2500 may simulate binaural hearing and capture a 3D stereo sound field around about a user's head. In some embodiments, acoustic transducers 2520(A) and 2520(B) may be connected to augmented-reality system 2500 via a wired connection 2530, and in other embodiments acoustic transducers 2520(A) and 2520(B) may be connected to augmented-reality system 2500 via a wireless connection (e.g., a BLUETOOTH connection). In still other embodiments, acoustic transducers 2520(A) and 2520(B) may not be used at all in conjunction with augmented-reality system 2500.

Acoustic transducers 2520 on frame 2510 may be positioned in a variety of different ways, including along the length of the temples, across the bridge, above or below display devices 2515(A) and 2515(B), or some combination thereof. Acoustic transducers 2520 may also be oriented such that the microphone array is able to detect sounds in a wide range of directions surrounding the user wearing the augmented-reality system 2500. In some embodiments, an optimization process may be performed during manufacturing of augmented-reality system 2500 to determine relative positioning of each acoustic transducer 2520 in the microphone array.

In some examples, augmented-reality system 2500 may include or be connected to an external device (e.g., a paired device), such as neckband 2505. Neckband 2505 generally represents any type or form of paired device. Thus, the following discussion of neckband 2505 may also apply to various other paired devices, such as charging cases, smart watches, smart phones, wrist bands, other wearable devices, hand-held controllers, tablet computers, laptop computers, displays, and other external compute devices, etc.

As shown, neckband 2505 may be coupled to eyewear device 2502 via one or more connectors. The connectors may be wired or wireless and may include electrical and/or non-electrical (e.g., structural) components. In some cases, eyewear device 2502 and neckband 2505 may operate independently without any wired or wireless connection between them. While FIG. 25 illustrates the components of eyewear device 2502 and neckband 2505 in example locations on eyewear device 2502 and neckband 2505, the components may be located elsewhere and/or distributed differently on eyewear device 2502 and/or neckband 2505. In some embodiments, the components of eyewear device 2502 and neckband 2505 may be located on one or more additional peripheral devices paired with eyewear device 2502, neckband 2505, or some combination thereof.

Pairing external devices, such as neckband 2505, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 2500 may be provided by a paired device or shared between a paired device and an eyewear device, thus reducing the weight, heat profile, and form factor of the eyewear device overall while still retaining desired functionality. For example, neckband 2505 may allow components that would otherwise be included on an eyewear device to be included in neckband 2505 since users may tolerate a heavier weight load on their shoulders than they would tolerate on their heads. Neckband 2505 may also have a larger surface area over which to diffuse and disperse heat to the ambient environment. Thus, neckband 2505 may allow for greater battery and computation capacity than might otherwise have been possible on a stand-alone eyewear device. Since weight carried in neckband 2505 may be less invasive to a user than weight carried in eyewear device 2502, a user may tolerate wearing a lighter eyewear device and carrying or wearing the paired device for greater lengths of time than a user would tolerate wearing a heavy stand-alone eyewear device, thereby enabling users to more fully incorporate artificial-reality environments into their day-to-day activities.

Neckband 2505 may be communicatively coupled with eyewear device 2502 and/or to other devices. These other devices may provide certain functions (e.g., tracking, localizing, depth mapping, processing, storage, etc.) to augmented-reality system 2500. In the embodiment of FIG. 25, neckband 2505 may include two acoustic transducers (e.g., 2520(I) and 2520(J)) that are part of the microphone array (or potentially form their own microphone subarray). Neckband 2505 may also include a controller 2525 and a power source 2535.

Acoustic transducers 2520(I) and 2520(J) of neckband 2505 may be configured to detect sound and convert the detected sound into an electronic format (analog or digital). In the embodiment of FIG. 25, acoustic transducers 2520(I) and 2520(J) may be positioned on neckband 2505, thereby increasing the distance between the neckband acoustic transducers 2520(I) and 2520(J) and other acoustic transducers 2520 positioned on eyewear device 2502. In some cases, increasing the distance between acoustic transducers 2520 of the microphone array may improve the accuracy of beamforming performed via the microphone array. For example, if a sound is detected by acoustic transducers 2520(C) and 2520(D) and the distance between acoustic transducers 2520(C) and 2520(D) is greater than, e.g., the distance between acoustic transducers 2520(D) and 2520(E), the determined source location of the detected sound may be more accurate than if the sound had been detected by acoustic transducers 2520(D) and 2520(E).

Controller 2525 of neckband 2505 may process information generated by the sensors on neckband 2505 and/or augmented-reality system 2500. For example, controller 2525 may process information from the microphone array that describes sounds detected by the microphone array. For each detected sound, controller 2525 may perform a direction-of-arrival (DOA) estimation to estimate a direction from which the detected sound arrived at the microphone array. As the microphone array detects sounds, controller 2525 may populate an audio data set with the information. In embodiments in which augmented-reality system 2500 includes an inertial measurement unit, controller 2525 may compute all inertial and spatial calculations from the IMU located on eyewear device 2502. A connector may convey information between augmented-reality system 2500 and neckband 2505 and between augmented-reality system 2500 and controller 2525. The information may be in the form of optical data, electrical data, wireless data, or any other transmittable data form. Moving the processing of information generated by augmented-reality system 2500 to neckband 2505 may reduce weight and heat in eyewear device 2502, making it more comfortable to the user.

Power source 2535 in neckband 2505 may provide power to eyewear device 2502 and/or to neckband 2505. Power source 2535 may include, without limitation, lithium ion batteries, lithium-polymer batteries, primary lithium batteries, alkaline batteries, or any other form of power storage. In some cases, power source 2535 may be a wired power source. Including power source 2535 on neckband 2505 instead of on eyewear device 2502 may help better distribute the weight and heat generated by power source 2535.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 2600 in FIG. 26, that mostly or completely covers a user's field of view. Virtual-reality system 2600 may include a front rigid body 2602 and a band 2604 shaped to fit around a user's head. Virtual-reality system 2600 may also include output audio transducers 2606(A) and 2606(B). Furthermore, while not shown in FIG. 26, front rigid body 2602 may include one or more electronic elements, including one or more electronic displays, one or more inertial measurement units (IMUs), one or more tracking emitters or detectors, and/or any other suitable device or system for creating an artificial-reality experience.

Artificial-reality systems may include a variety of types of visual feedback mechanisms. For example, display devices in augmented-reality system 2500 and/or virtual-reality system 2600 may include one or more liquid crystal displays (LCDs), light emitting diode (LED) displays, microLED displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in augmented-reality system 2500 and/or virtual-reality system 2600 may include microLED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 2500 and/or virtual-reality system 2600 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of."

Finally, for ease of use, the terms "including" and "having" (and their derivatives), as used in the specification and claims, are interchangeable with and have the same meaning as the word "comprising."

It will be understood that when an element such as a layer or a region is referred to as being formed on, deposited on, or disposed "on," "over," or "overlying' another element, it may be located directly on at least a portion of the other element, or one or more intervening elements may also be present. In contrast, when an element is referred to as being "directly on," "directly over," or "directly overlying" another element, it may be located on at least a portion of the other element, with no intervening elements present.

As used herein, the term "substantially" in reference to a given parameter, property, or condition may mean and include to a degree that one of ordinary skill in the art would understand that the given parameter, property, or condition is met with a small degree of variance, such as within acceptable manufacturing tolerances. By way of example, depending on the particular parameter, property, or condition that is substantially met, the parameter, property, or condition may be at least approximately 90% met, at least approximately 95% met, or even at least approximately 99% met.

As used herein, the term "approximately" in reference to a particular numeric value or range of values may, in certain embodiments, mean and include the stated value as well as all values within 10% of the stated value. Thus, by way of example, reference to the numeric value "50" as "approximately 50" may, in certain embodiments, include values equal to 50±5, i.e., values within the range 45 to 55.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to an optical element that comprises or includes ultra-high molecular weight polyethylene include embodiments where an optical element consists of ultra-high molecular weight polyethylene and embodiments where an optical element consists essentially of ultra-high molecular weight polyethylene.

What is claimed is:

1. A multilayer polymer thin film comprising:
a first polyethylene thin film having a first in-plane orientation of crystalline axes and a weight average molecular weight of at least approximately 500,000 g/mol; and
a second polyethylene thin film having a second in-plane orientation of crystalline axes and a weight average molecular weight of at least approximately 500,000 g/mol, wherein the multilayer polymer thin film comprises:
transparency within the visible spectrum of at least approximately 80%;
bulk haze of less than approximately 5%; and
an in-plane elastic modulus of at least approximately 10 GPa.

2. The multilayer polymer thin film of claim 1, comprising transparency within a infrared spectrum of at least approximately 80%.

3. The multilayer polymer thin film of claim 1, comprising transparency within a radio frequency spectrum of at least approximately 80%.

4. The multilayer polymer thin film of claim 1, comprising an in-plane tensile strength of at least approximately 0.5 GPa.

5. The multilayer polymer thin film of claim 1, wherein an in-plane thermal conductivity of the thin film is anisotropic.

6. The multilayer polymer thin film of claim 1, comprising an in-plane thermal conductivity of at least approximately 5 W/mK.

7. The multilayer polymer thin film of claim 6, wherein an in-plane anisotropy of the thermal conductivity is at least 2:1.

8. The multilayer polymer thin film of claim 1, comprising a crystalline polyethylene content of at least approximately 30%.

9. The multilayer polymer thin film of claim 1, wherein a density of the polyethylene is less than approximately 1.5 g/cm$^3$.

10. The multilayer polymer thin film of claim 1, comprising a thickness of at least approximately 5 micrometers.

11. A multilayer thin film comprising:
a first crystalline polymer layer and a second crystalline polymer layer, the first crystalline polymer layer having a first in-plane orientation of crystalline axes and the second crystalline polymer layer having a second in-plane orientation of crystalline axes such that the crystalline axes of the first and second crystalline polymer layers are rotationally misoriented in-plane by an angle ($\theta$), where $0<\theta\leq90°$, each of the first and second crystalline polymer layers comprise a weight average molecular weight of at least approximately 500,000 g/mol and the multilayer thin film comprises at least two attributes (i-iv) selected from the group consisting of:
(i) transparency within a visible spectrum of at least approximately 80%;
(ii) bulk haze of less than approximately 5%;
(iii) an in-plane elastic modulus of at least approximately 10 GPa; and
(iv) an in-plane thermal conductivity of at least approximately 5 W/mK.

12. The multilayer thin film of claim 11, wherein the thin film comprises at least three of the attributes (i-iv).

13. The multilayer thin film of claim 11, comprising a crystalline polymer content of at least approximately 30%.

14. The multilayer thin film of claim 11, wherein a density of the crystalline polymer is less than approximately 1.5 g/cm$^3$.

15. The multilayer thin film of claim 11, wherein the crystalline polymer comprises polyethylene.

* * * * *